(12) United States Patent
Kim

(10) Patent No.: US 12,724,268 B2
(45) Date of Patent: Sep. 1, 2026

(54) WEARABLE ELECTRONIC DEVICE INCLUDING LENS ASSEMBLY

(71) Applicant: Samsung Electronics Co., Ltd., Gyeonggi-do (KR)

(72) Inventor: Youngran Kim, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 266 days.

(21) Appl. No.: 18/218,175

(22) Filed: Jul. 5, 2023

(65) Prior Publication Data

US 2024/0004202 A1 Jan. 4, 2024

Related U.S. Application Data

(63) Continuation of application No. PCT/KR2023/009399, filed on Jul. 4, 2023.

(30) Foreign Application Priority Data

Jul. 4, 2022 (KR) ........................ 10-2022-0082088
Nov. 25, 2022 (KR) ........................ 10-2022-0160555

(51) Int. Cl.
*G02B 27/01* (2006.01)
*G02B 9/34* (2006.01)

(52) U.S. Cl.
CPC ........... *G02B 27/0172* (2013.01); *G02B 9/34* (2013.01); *G02B 2027/015* (2013.01)

(58) Field of Classification Search
CPC ............ G02B 27/0172; G02B 17/0856; G02B 27/286; G02B 2027/0123; G02B 25/001; G02B 7/021; G02B 13/18; G02B 2027/0127; G02B 2027/0178; G02B 5/30; G02B 5/3025; G02B 9/34;
(Continued)

(56) References Cited

U.S. PATENT DOCUMENTS

2015/0338653 A1 11/2015 Subramaniam et al.
2016/0070104 A1 3/2016 Yang
(Continued)

FOREIGN PATENT DOCUMENTS

CN 110764266 A 2/2020
CN 114236864 A * 3/2022 ........... G02B 27/286
(Continued)

OTHER PUBLICATIONS

International Search Report dated Oct. 4, 2023.
Extended European Search report dated May 2, 2025.

*Primary Examiner* — Matthew Y Lee
(74) *Attorney, Agent, or Firm* — CANTOR COLBURN LLP

(57) ABSTRACT

According to an embodiments, an wearable electronic device comprises: at least four lenses arranged along an optical axis from a user's eye-side to a display, the at least four lenses including a first lens and a second lens; wherein the first lens is closest to the user's eye-side of the at least four lenses and includes at least one flat surface, and a first quarter wave plate (QWP) and a first refractive member disposed on the at least one flat surface, wherein the second lens from the user's eye-side includes at least one convex surface and a second refractive member disposed on the at least one convex surface.

19 Claims, 17 Drawing Sheets

(58) Field of Classification Search
CPC ...... G02B 2027/015; G02B 3/00; G02B 3/02; G02B 5/08; G02B 13/00; G02B 13/004; G02B 27/01; G02B 27/283; H04N 13/344; H04N 13/332
See application file for complete search history.

(56) References Cited

U.S. PATENT DOCUMENTS

| | | | | |
|---|---|---|---|---|
| 2016/0252710 | A1 | 9/2016 | Lee et al. | |
| 2018/0039052 | A1 | 2/2018 | Khan et al. | |
| 2019/0004286 | A1 | 1/2019 | Heu et al. | |
| 2019/0079234 | A1* | 3/2019 | Takagi | G02B 27/0101 |
| 2019/0094519 | A1* | 3/2019 | Komatsu | G02B 5/0221 |
| 2019/0265465 | A1 | 8/2019 | Wong et al. | |
| 2020/0081234 | A1 | 3/2020 | Etter et al. | |
| 2022/0004256 | A1* | 1/2022 | Sztuk | G06T 19/006 |
| 2023/0143390 | A1* | 5/2023 | Chen | G02B 17/08 359/362 |
| 2023/0288626 | A1* | 9/2023 | Kuo | G02B 13/004 |
| 2023/0333596 | A1* | 10/2023 | Gao | G06F 3/013 |
| 2023/0359033 | A1* | 11/2023 | Iba | G02B 5/30 |
| 2023/0384594 | A1* | 11/2023 | Hong | G02B 13/0035 |

FOREIGN PATENT DOCUMENTS

| | | | | |
|---|---|---|---|---|
| CN | 114415381 | A * | 4/2022 | G02B 27/283 |
| CN | 114706228 | A | 7/2022 | |
| KR | 1997-0071105 | A | 11/1997 | |
| KR | 1999-0075910 | A | 10/1999 | |
| KR | 10-2012-0057705 | A | 6/2012 | |
| KR | 101590825 | B1 * | 2/2016 | G02B 27/027 |
| KR | 10-2017-0012370 | A | 2/2017 | |
| KR | 10-2018-0046506 | A | 5/2018 | |
| KR | 10-2019-0003113 | A | 1/2019 | |
| KR | 10-2019-0020826 | A | 3/2019 | |
| KR | 10-2021-0130672 | A | 11/2021 | |
| WO | 2022038777 | A1 | 2/2022 | |

* cited by examiner

WEARABLE ELECTRONIC DEVICE INCLUDING LENS ASSEMBLY

CLAIM OF PRIORITY

This application is a continuation of International application No. PCT/KR2023/009399 filed on Jul. 4, 2023, which is based on and claims the benefit of a Korean Patent Application No. 10-2022-0082088 filed on Jul. 4, 2022, and Korean Patent Application No. 10-2022-0160555 filed on Nov. 25, 2022, in the Korean Intellectual Property Office, the disclosures of which are incorporated by references herein in their entireties.

BACKGROUND

1. Technical Field

The disclosure relates to a wearable electronic device including a lens assembly.

2. Description of Related Art

Portable electronic devices, such as electronic schedulers, portable multimedia players, mobile communication terminals, tablet personal computers (PCs), etc., are generally equipped with a display member and a battery. However, the shape of the portable electronic devices may be limited to a bar, clamshell, or slidable shape in order to accommodate displays or batteries. When display members and batteries are made smaller and have enhanced performance, electronic devices (hereinafter, 'wearable electronic devices') which may be put on the user's wrist, head, or other body portions are appearing.

Examples of wearable electronic devices include head-mounted wearable devices (HMD), smart glasses, smart watches (or bands), contact lens-type devices, ring-type devices, clothing/shoes/glove-type devices, and the like. Such body-worn electronic devices can be easy to carry and may enhance user accessibility.

The above-described information may be provided as related art for the purpose of helping understanding of the disclosure. No claim or determination is made as to whether any of the foregoing is applicable as background art in relation to the disclosure.

SUMMARY

According to an embodiment, an wearable electronic device comprises: at least four lenses arranged along an optical axis from a user's eye-side to a display, the at least four lenses including a first lens and a second lens; wherein the first lens is closest to the user's eye-side of the at least four lenses and includes at least one flat surface, and a first quarter wave plate (QWP) and a first refractive member disposed on the at least one flat surface, wherein the second lens from the user's eye-side includes at least one convex surface and a second refractive member disposed on the at least one convex surface, and wherein the wearable electronic device satisfies formula 1 and formula 2 as set forth below, $$M12 \geq 0.99 \qquad \text{[formula 1]}$$

$$TTL/ImgH \leq 1.75 \qquad \text{[formula 2]}$$

(wherein M12 is a combined group magnification of the first lens and second lens, TTL is a "total top length", indicating a distance between an eye-side surface of the first lens and the display, and ImgH is a maximum image height of the display).

According to an embodiment, a wearable electronic device comprises: a first lens, a second lens, a third lens, and a fourth lens sequentially arranged along an optical axis direction from a user's eye-side to a display; wherein the first lens includes a substantially flat surface laminated with a first quarter wave plate and a reflective polarizer on the substantially flat surface, wherein the second lens includes at least one convex surface having a beam splitter formed thereon, wherein a second quarter wave plate and a polarizer are formed on a display-side surface of the fourth lens, wherein the first lens and the second lens are configured to move on an optical axis direction, and wherein the wearable electronic device satisfies formula 1 and formula 2 as set forth below, $$M12 \geq 0.99 \qquad \text{[formula 1]}$$

$$TTL/ImgH \leq 1.75 \qquad \text{[formula 2]}$$

(wherein M12 is a combined group magnification of the first lens and the second lens, TTL is a "total top length" indicating a distance between an eye-side surface of the first lens and the display, and ImgH is a maximum image height of the display).

BRIEF DESCRIPTION OF THE DRAWINGS

The foregoing and other aspects, configurations, and/or advantages of an embodiment of the disclosure will be more apparent from the following detailed description taken in conjunction with the accompanying drawings.

DETAILED DESCRIPTION

Conventionally, a head-mounted wearable device is configured using a single lens, but it may be difficult to implement a vision correction function. In some cases, a plurality of lenses (e.g., three or less lenses) are used, but it may be difficult to achieve slimness.

Objects of the disclosure are not limited to the foregoing, and other unmentioned objects would be apparent to one of ordinary skill in the art from the following description.

Figure 1:
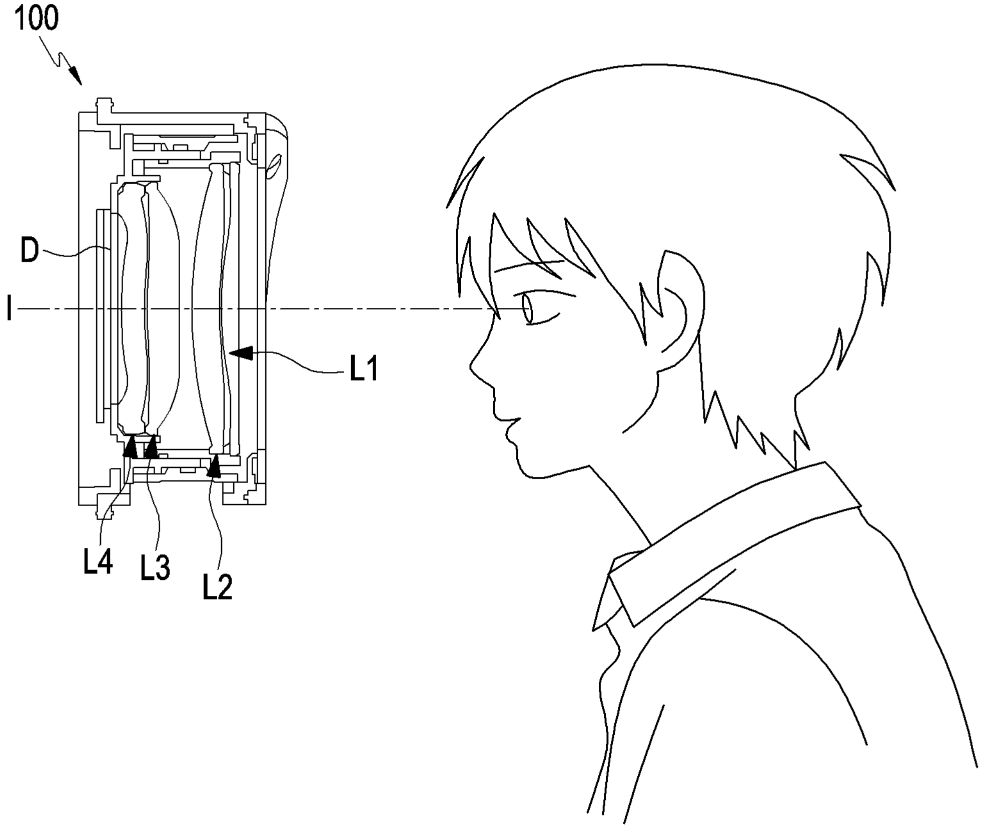
FIG. 1 is a view illustrating a wearable electronic device according to an embodiment.

FIG. 1 illustrates a wearable electronic device according to an embodiment of the disclosure.

Although some numbers are presented in describing an embodiment of the disclosure, it should be noted that the numbers do not limit the embodiment of the disclosure as long as the numbers are not set forth in the claims.

Referring to FIG. 1, the wearable electronic device 100 may be a glasses-type electronic device. The user may visually recognize their surrounding objects or environment while wearing the wearable electronic device 100. The wearable electronic device 100 may obtain and/or recognize a visual image of the environment or an object in the direction that the wearable electronic device 100 is pointed, using a camera. The user views and receives information about the object or environment from an external electronic device through a network. The wearable electronic device 100 may provide the received object- or environment-related information as audio information and/or visual information. For example, the wearable electronic device 100 may provide the received object- or environment-related information, in a visual form, to the user through a display member. By implementing information about the object or environment in a visual form and combining them with a real image (or video) of the user's ambient environment, the wearable electronic device 100 may implement augmented reality (AR), virtual reality (VR), mixed Reality (MR), and/or extended reality (XR). The display member may output a screen in which the augmented reality object is added to the actual image (or video) of the environment around the user, thereby providing information regarding the surrounding thing or environment to the user.

In the following detailed description, the "state or position in which the electronic device or a designated component of the electronic device faces the user's face" may be mentioned in various manners and it should be noted that this presumes that the user wears the wearable electronic device 100.

The wearable electronic device 100 may include at least one display member, a lens frame, and a wearing member. A pair of display members including a first display member and a second display member may be positioned to correspond to the user's right and left eyes, respectively, while the wearable electronic device 100 is worn on the user's body. In an embodiment, the wearable electronic device 100 may have a housing shape (e.g., goggles shape) including one display member corresponding to the right eye and the left eye.

The display member is a component for providing the user with visual information. The display member may include, e.g., a lens assembly, a display D, and at least one sensor. Here, the lens assembly and the display D each may be formed to be transparent or semi-transparent. However, the display member is not limited thereto. As another example, the display member may include a window member that may be a semi-parent glass or a member capable of adjusting its light transmittance depending on the concentration of coloring. As another example, the display member may include a reflective lens or a lens including a waveguide. An image output from the light output device (e.g., a projector) may form on each lens, providing the user with visual information. For example, the display member may mean a display that may include a waveguide (e.g., a light waveguide) in at least a portion of each lens and transfer the image (or light) output from the light output device through the waveguide included in the display member to the user's eye while simultaneously transferring the real world through the area to the user's eye in a see-through fashion. The lens assembly (e.g., the lens assembly 200 or 300 of FIGS. 4 to 11C) is a component including a plurality of lenses (e.g., L1, L2, L3, and L4) and be disposed to be aligned with the optical axis O-I in the space inside the wearable electronic device 100.

Figure 2A:
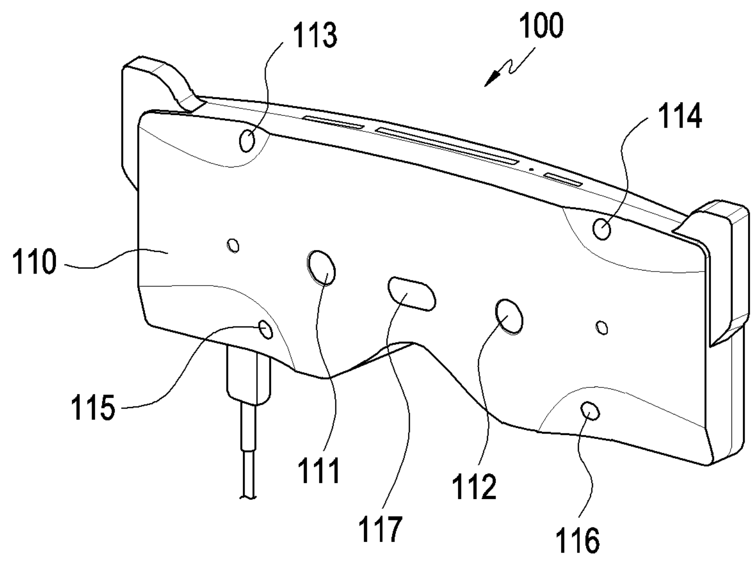
FIG. 2A is a front view illustrating a wearable electronic device according to an embodiment of the disclosure.
Figure 2B:
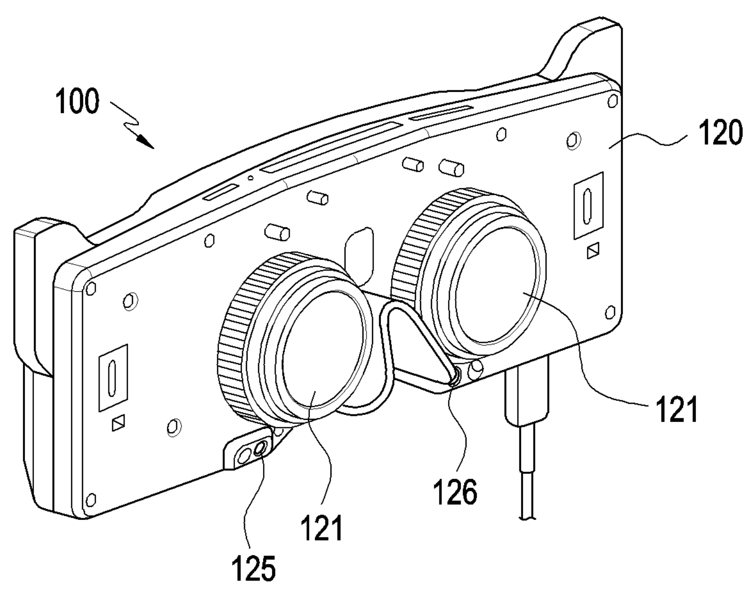
FIG. 2B is a rear view illustrating a wearable electronic device according to an embodiment of the disclosure.

FIG. 2A is a front view illustrating a wearable electronic device according to an embodiment of the disclosure. FIG. 2B is a rear view illustrating a wearable electronic device according to an embodiment of the disclosure.

As an embodiment, the electronic device 100 may be AR glasses or video see-through (VST) type VR glasses. In an embodiment, the VST-type VR glasses may capture the external environment by a camera (not shown) and display the captured external environment image, along with VR content, to the user through the display D. For example, the VR content may be content, such as navigation or data related to a specific object.

Referring to FIGS. 2A and 2B, in an embodiment, camera modules 111, 112, 113, 114, 115, and 116 and/or a depth sensor 117 may be disposed on the first surface 110 of the housing. The camera modules 111, 112, 113, 114, 115, and 116 and depth sensor 117 can obtain information related to the ambient environment. In certain embodiments, the depth sensor 117 can detect the depth of an object by transmitting infrared light and receiving reflected infrared light. In certain embodiments, the depth sensor 117 may be omitted. The depth of objects can be detected using stereoscopy based on images by two or more of the camera modules 111, 112, 113, 114, 115, and 116 and their respective positions.

In an embodiment, the camera modules 111 and 112 may obtain images related to the ambient environment of the wearable electronic device.

In an embodiment, the camera modules 113, 114, 115, and 116 may obtain images while the wearable electronic device is worn by the user. The camera modules 113, 114, 115, and 116 may be used for hand detection, tracking, and recognition of the user gesture (e.g., hand motion). The camera modules 113, 114, 115, and 116 may be used for 3 degrees of freedom (DoF) or 6DoF head tracking, location (space or environment) recognition, and/or movement recognition. In an embodiment, the camera modules 111 and 112 may be used for hand detection and tracking and recognition of the user's gesture.

In an embodiment, the depth sensor 117 may be configured to transmit a signal and receive a signal reflected from an object and be used for identifying the distance to the object, such as time of flight (TOF).

Camera modules 125 and 126 for face recognition and/or a display 121 (and/or lens) may be disposed on the second surface 120 of the housing.

The face recognition camera modules 125 and 126 adjacent to the display may be used for recognizing the user's face or may recognize and/or track both eyes of the user.

The display 121 (and/or lens) may be disposed on the second surface 120 of the wearable electronic device 100. In an embodiment, the wearable electronic device 100 may not include the camera modules 115 and 116 among the plurality of camera modules 113, 114, 115, and 116. The wearable electronic device 100 may omit at least one of the components shown in FIGS. 2A and 2B or may further include components not shown in the drawings. For example, the wearable electronic device 100 may omit at least one of the camera modules or may include more camera modules.

As described above, according to an embodiment, the wearable electronic device 100 may be shaped to facilitating wearing on the user's head. The wearable electronic device 100 may further include a strap and/or a wearing member to be fixed on the user's body part. The wearable electronic device 100 may provide the user experience based on augmented reality, virtual reality, and/or mixed reality while worn on the user's head.

Figure 3:
FIG. 3 illustrates a state in which the light output from a display is transferred to a user's eyes according to an embodiment of the disclosure.
Figure 3:
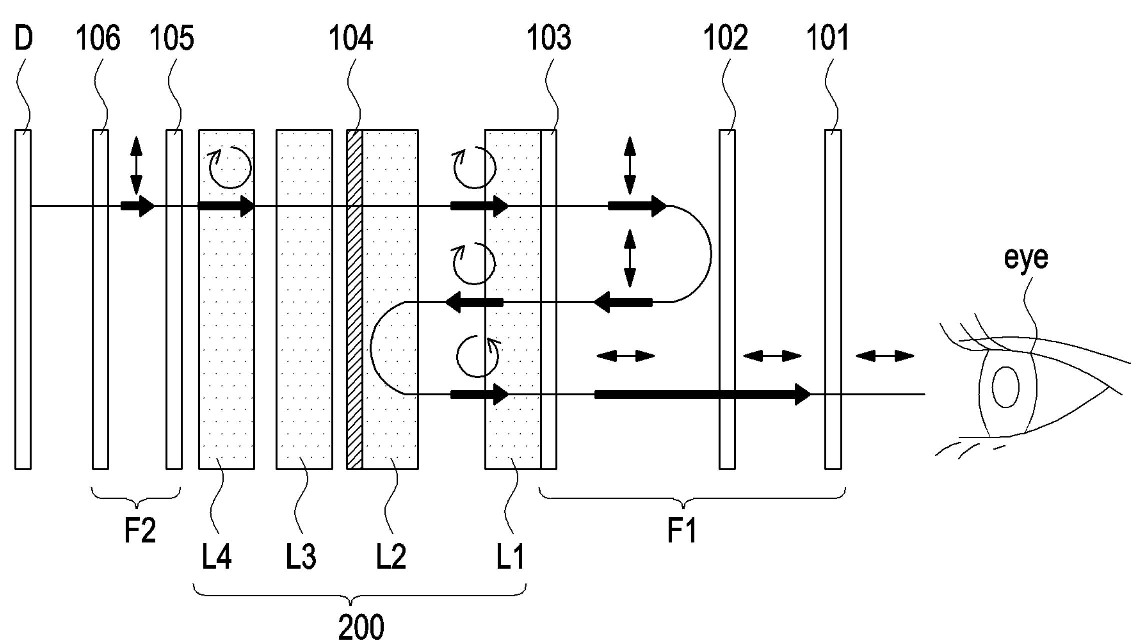

FIG. 3 illustrates light output from a display D and transmitted to a user's eyes according to an embodiment of the disclosure. The wearable electronic device 100 includes a lens assembly 200. The lens assembly 200 includes lenses L1, L2, L3, and L4. The first lens (from the user's eye side) L1 includes at least one quarter wave plate 103, while the second lens L2 includes at least one refractive member 104. The focal length of the lens assembly may be adjusted by adjusting the optical path of the incident light.

The wearable electronic device 100 of the disclosure may include a lens assembly 200, at least one quarter wave plate (QWP), at least one reflective polarizer (RP), and at least one beam splitter. The wearable electronic device 100 of the disclosure may provide a vision correction function to the user by adjusting the diopter as at least some lenses are movable and provide at least one quarter wave plate (QWP), at least one reflective polarizer (RP), and at least one beam splitter to extend and/or adjust the length of the optical path of light, adjusting the focal length or increasing the quality of the output image. The lens assembly 200 is described below in detail with reference to embodiments of FIG. 4 and the subsequent views, and other components, e.g., at least one quarter wave plate (QWP), at least one reflective polarizer (RP), and at least one beam splitter, included in the wearable electronic device 100 are described in detail.

If the wearable electronic device (e.g., AR/VR glasses) has a fixed focal length, it may be difficult to correct refractive errors (e.g., eye refractions due to eye disorders, such as presbyopia, myopia, or hyperopia) through the system (e.g., AR/VR system) itself. Accordingly, the resolution of the virtual image output may be limited. In contrast, the wearable electronic device 100 of the disclosure enables display of a virtual image in various focal lengths by extending the optical path of the incident light. The foregoing makes it possible to correct vision and increase the image resolution.

The wearable electronic device 100 of the disclosure may be an optical device (e.g., AR/VR glasses) that constitutes an optical system by being mounted along with a lens assembly 200. The lens assembly 200 can include a display D and a plurality of lenses. Here, the lens assembly 200 may include a plurality of (e.g., four) lenses (e.g., L1, L2, L3, and L4). The display D may include a screen display area that exposes visual information to portions corresponding to the user's eyes when the user wears the wearable electronic device 100. The display D may include, e.g., a liquid crystal display (LCD), a light emitting diode (LED) display, an organic light emitting diode (OLED) display, or a microelectromechanical systems (MEMS) display, or an electronic paper display. The display D may display, e.g., various contents (e.g., text, images, videos, icons, or symbols) to the user.

According to an embodiment, the light output through the display D may pass through at least one quarter wave plate, at least one reflective polarizer, and at least one beam splitter and then the lens assembly 200 before various contents (e.g., text, images, videos, icons, or symbols) are transferred to the user through the display D. The order in which the light passes through the at least one quarter wave plate, the at least one reflective polarizer, and the at least one beam splitter and the lens assembly 200 may be set to vary. According to an embodiment of the disclosure, the quarter wave plate and the reflective polarizer may be disposed adjacent to at least one of the two surfaces of the first lens L1 (hereinafter, referred to as a 'first lens L1') from the user's eyes of the lens assembly 200, and the beam splitter may be disposed adjacent to the display-side surface of the second lens L2 (hereinafter, referred to as a 'second lens L2') from the user's eyes of the lens assembly 200.

FIG. 3 illustrates that the quarter wave plate 103 and the reflective polarizer 102 are disposed adjacent to the surface of the first lens L1 that is on the side of the user's eyes. Beam splitter 104 is disposed adjacent to the display-side surface of the second lens L2. The reflective polarizer 102 may be configured in the form of a film and be laminated with the quarter wave plate 103 to form a first film portion F1 and be attached to the first lens L1 from the user's eyes. Here, 'lamination' may mean that two different members are bonded by an adhesive provided on at least one of the two members. The first film portion F1 in the laminated form of the quarter wave plate 103 and the reflective polarizer 102 may be thinner and provide better optical properties than when not laminated but simply stacked onto each other.

As shown in FIG. 3, the first film portion F1 may further include at least one polarization film (e.g., first polarizer 101) separately provided. Additionally or alternatively, the first film portion F1 may further include at least one anti-reflection (AR) film (not shown). Referring to FIG. 3, the first film portion F1 may be disposed close to the user's eyes with respect to the lens assembly 200, selectively transmitting, reflecting, and/or blocking the light coming to the user's eyes. The beam splitter 104 may be disposed between the lenses, e.g., the second lens L2 and the third lens L3, of the lens assembly 200. The beam splitter 104 may be configured to transmit a portion of the light while reflecting another portion of the light. For example, the beam splitter 104 may be configured to transmit 50% of the light and reflect 50% of the light. FIG. 3 may illustrate a state in which the beam splitter 104 transmits 50% of the light. According to an embodiment, the beam splitter 104 may be comprised of a translucent mirror and be coated on one surface of the second lens L2. Hereinafter, based on the functional aspect of light reflection, the reflective polarizer 102 may be referred to as a 'first refractive member 102,' and the beam splitter 104 may be referred to as a 'second refractive member 104.'

In the following description, the direction from the user's eyes to the display D may be referred to as a first direction. The direction from the display D to the user's eyes may be referred to as a second direction. Both the first direction and the second direction may be parallel to the optical axis O-I. The lens assembly 200 may include a plurality of lenses (e.g., the first lens L1, the second lens L2, the third lens L3, and the fourth lens L4) sequentially disposed along the first direction.

The wearable electronic device 100 may include a second film portion F2. The second film portion F2 is disposed in a position farther from the user's eyes than the lens assembly 200. For example, the second film portion F2 may be disposed close to the display D. Accordingly, the second film portion F2 may selectively transmit, reflect, and/or block the light coming to the lens assembly 200. Here, the second film portion F2 may include a quarter wave plate 105 and a polarizer 106. The second film portion F2 may also be disposed in a laminated form of the quarter wave plate 105 and the polarizer 106. To distinguish the components, the quarter wave plate 103 of the first film portion F1 may be referred to as a first quarter wave plate 103, and the quarter wave plate 105 of the second film portion F2 may be referred to as a second quarter wave plate 105. Further, to be distinguished from the first polarizer 101 included in the first film portion F1, the polarizer 106 of the second film portion F2 may be referred to as a second polarizer 106.

Light from the display D passes through second polarizer 106 and the quarter wave plate 105. The second polarizer 106 pass vertically polarized light and block horizontally polarized light. The second quarter wave plate 105 may convert the light to circularly polarized light that passes through the lens assembly 200, including the beam splitter 104 and first quarter wave plate 103. The reflective polarizer 102 may reflect the light to the first quarter wave plate 103. The beam splitter 104 may reflect the light back to the first quarter wave plate 103. The light passed through the first quarter wave plate 103 passes through the reflective polarizer 102 and the first polarizer 101. The light passed the first polarizer 101 reaches the user's eyes.

Referring to FIG. 3, the wearable electronic device 100 may operate as follows. The light output from the display D may pass through the second film portion F2, the lens assembly 200, and the first film portion F1 and then reach the user's eyes. In this case, the second polarizer 106 of the second film portion F2 may transmit first linearly polarized light, e.g., vertically polarized light (or p polarized light) but not transmit second linearly polarized light, e.g., horizontally polarized light (or s polarized light). In other words, of the light reaching the second polarizer 106, the vertically polarized light (or p polarized light) only may be transmitted. The light transmitted through the second polarizer 106 may be converted into circularly polarized light (right-circularly polarized light or left-circularly polarized light) by the second quarter wave plate 105, and the circularly polarized light may pass through the lens assembly 200 and the beam splitter 104 and then reach the first quarter wave plate 103. The circularly polarized light reaching the first quarter wave plate 103 may be converted back into the linearly polarized light (e.g., vertically polarized light (or p polarized light)) while passing through the first quarter wave plate 103 and reach the reflective polarizer 102.

The light may move in the second direction (display D->user's eye) until it reaches the reflective polarizer 102. The light reaching the reflective polarizer 102 may be reflected by the reflective polarizer 102 in the first direction (user's eyes->display D). The light may be converted into circularly polarized light (right-circularly polarized light or left-circularly polarized light) while passing through the first quarter wave plate 103. The circularly polarized light (right-circularly polarized light or left-circularly polarized light) may be reflected by the beam splitter 104 in the second direction and, at this time, the phase may be shifted (e.g., from left-circularly polarized light to right-circularly polarized light, or from right-circularly polarized light to left-circularly polarized light).

The phase-shifted circularly polarized light may pass through the first quarter wave plate 103 and the reflective polarizer 102 along the second direction and reach the user's eyes. In this case, the light passing through the first quarter wave plate 103 may be converted into the horizontally polarized light (or s polarized light) and reach the user's eyes. However, it should be noted that the embodiment of FIG. 3 is an example of a change in the state of the light passing through the wearable electronic device 100 according to an embodiment, and the category of the disclosure is not necessarily limited to the embodiment.

Figure 4:
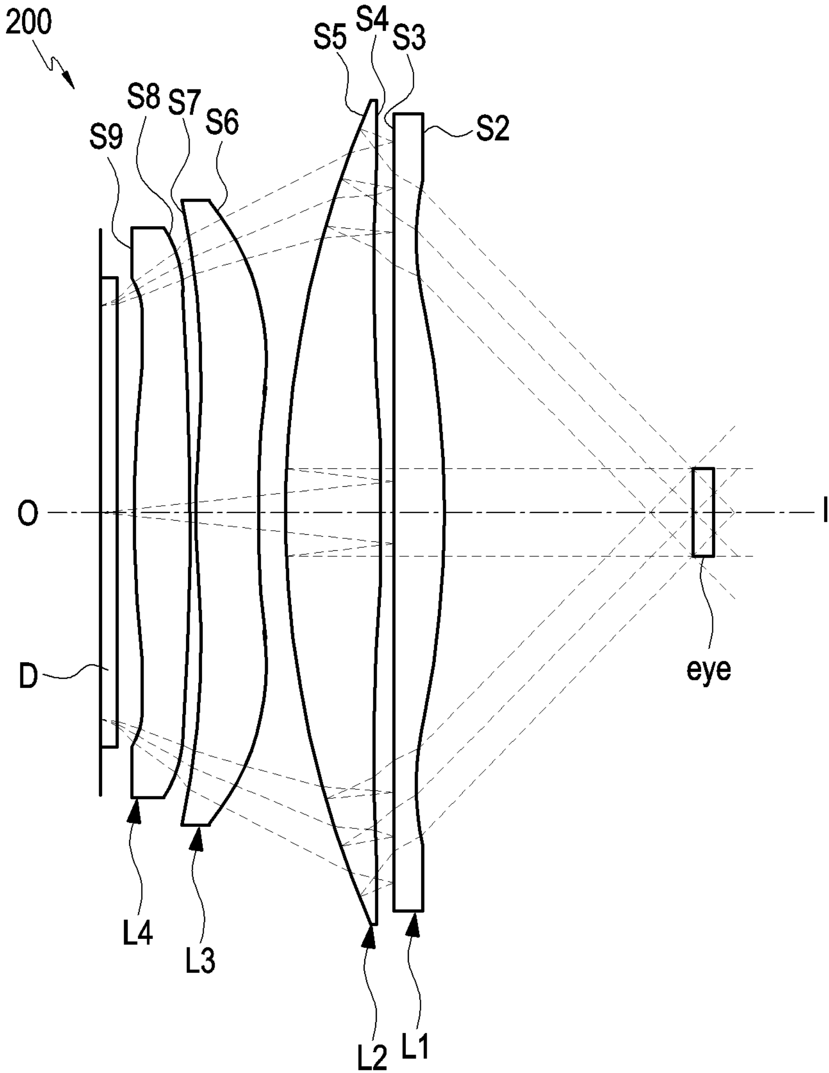
FIG. 4 is a view illustrating a lens assembly according to an embodiment.
Figure 5:
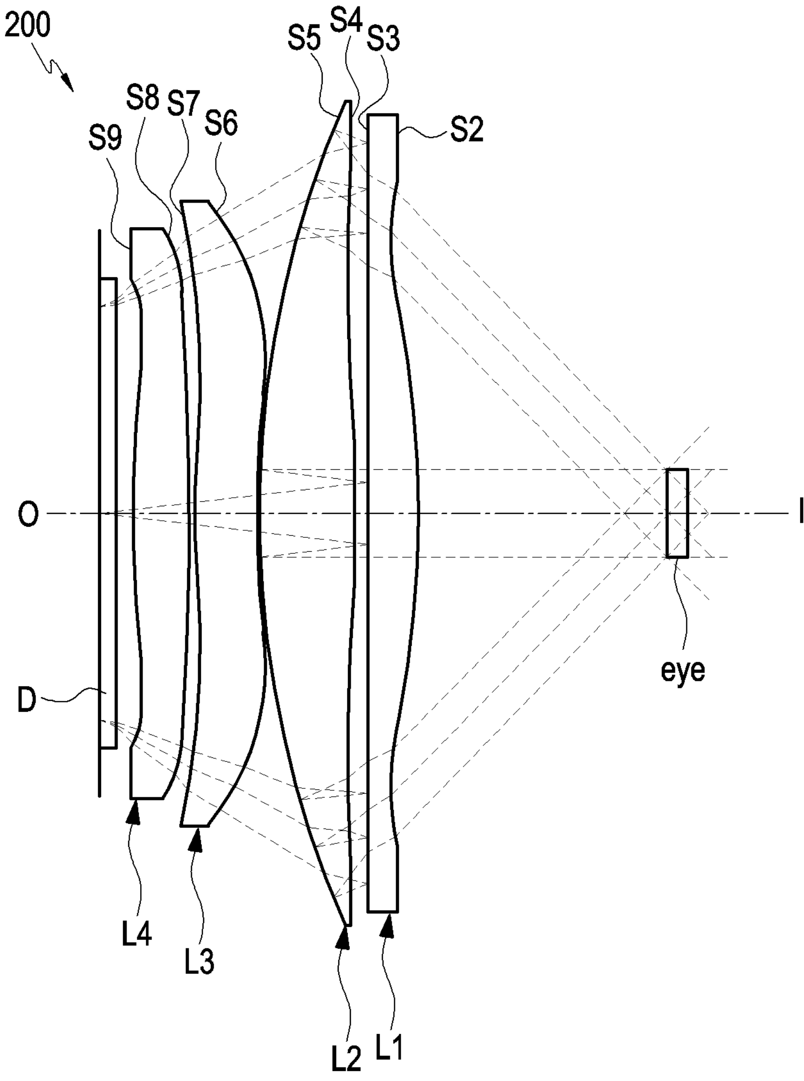
FIG. 5 is a view illustrating a lens assembly according to an embodiment.

FIG. 4 is a view illustrating a lens assembly 200 according to an embodiment. FIG. 5 is a view illustrating a lens assembly 200 according to an embodiment. FIG. 4 may illustrate the lens assembly 200 when the diopter is 0, and FIG. 5 may illustrate the lens assembly 200 when the diopter is −6. The lens assembly 200 may include, from the user's eye side, a first lens L1 with a positive refractive power, a second lens L2 with a positive refractive power, a third lens L3 with a negative refractive power, and a fourth lens L4 with a positive refractive power.

At least one of the plurality of lenses L1, L2, L3, and L4 included in the lens assembly 200 may include a lens formed of a synthetic resin (e.g., plastic) material. According to an embodiment, the plurality of lenses may be formed of a synthetic resin so as to have a high design freedom in size or shape. According to an embodiment, all of the lenses L1, L2, L3, and L4 included in the lens assembly may be formed of a synthetic resin material. As such, as the plurality of lenses included in the lens assembly 100 are formed of a synthetic resin material, the wearable electronic device 100 where the lens assembly 100 is mounted may be advantageously made light and small.

The lens assembly 200 may be disposed on the optical axis O-I passing through the centers of the plurality of lenses from the object O (object side) on the display D to the user's eye-side I (image side). In the following description of the configuration of each lens, e.g., the user's eye-side may indicate the direction in which the user's eye is positioned. Since an image is formed on the user's eye and the user recognizes the object, the user's eye may sense the image. Further, the "surface facing the user's eye-side I" may be the surface on the side of the user's eye (e.g., image sensor) with respect to, e.g., the optical axis O-I and, in the drawings of the disclosure, means the right surface (or front surface) of the lens. The "surface facing the display (D) side O" may denote the left surface (or rear surface) of the lens with respect to the optical axis O-I in the drawings.

The portion of each lens, which is close to the optical axis O-I may be referred to as a chief portion. The portion further from the optical axis O-I (or around the edge of the lens) may be referred to as a marginal portion. The chief portion may be, e.g., a portion of a lens (e.g., the first lens L1) which crosses the optical axis O-I. The marginal portion may be, e.g., a portion of the lens (e.g., the first lens L1) which is spaced apart from the optical axis by a predetermined distance or more. The marginal portion may include an end portion of the lens which is positioned farthest from the optical axis O-I of the lens. Further, according to an embodiment of the disclosure, the light passing through the chief portion or the portion close to the chief portion may be referred to as a short axis light beam, and the light passing through the marginal portion may be referred to as a long axis light beam.

The radius of curvature, thickness, total length from image plane (TTL), and focal length of a lens as described herein may be in millimeters unless stated otherwise. The thickness of a lens, the interval between lenses, or TTL may be a distance measured from the center of the optical axis of the lens. In describing the shape of a lens, 'one surface of the lens is convex' may mean that the optical axis portion of the surface is convex, and 'one surface of the lens is concave' may mean that the optical axis portion of the surface is concave. Thus, although one surface of a lens (e.g., the optical axis portion of the surface) is described as convex in shape, edge portions of the lens (e.g., portions a predetermined distance apart from the optical axis portion of the surface) may be concave. Likewise, although one surface of a lens (e.g., the optical axis portion of the surface) is described as concave in shape, edge portions of the lens (e.g., portions a predetermined distance apart from the optical axis portion of the surface) may be convex. As used herein, the term 'inflection point' may mean a point where the radius of curvature changes in a portion which does not cross the optical axis.

The lens assembly 200 may include a first lens L1, a second lens L2, a third lens L3, and a fourth lens L4. The first lens L1, the second lens L2, the third lens L3, and the fourth lens L4 may be arranged in order from the side close to the eye to the display D when the user wears the wearable electronic device 100.

The first lens L1 included in the lens assembly 200 may have a positive refractive power. If light parallel with the optical axis is incident onto the lens with a positive refractive power, the light, after passing through the lens, may be focused. For example, the lens with a positive refractive power may be a lens based on the principle of a convex lens. In contrast, if parallel light is incident onto the lens with a negative refractive power, the light, after passing through the lens, may be dispersed. For example, the lens with a negative refractive power may be a lens based on the principle of a concave lens. According to an embodiment, in the case of a lens assembly including four lenses, the first lens L1, the second lens L2, and the fourth lens L4 may have a positive refractive power, and the third lens L3 may have a negative refractive power.

The first lens L1 included in the lens assembly 200 may include a surface S2 facing the user's eye-side I and a surface S3 facing the object side O on the screen of the display D. The second lens L2 included in the lens assembly 200 may include a surface S4 facing the user's eye-side I and a surface S5 facing the object side O on the screen of the display D. The third lens L3 included in the lens assembly 200 may include a surface S6 facing the user's eye-side I and a surface S7 facing the object side O on the screen of the display D. The fourth lens L4 included in the lens assembly 200 may include a surface S8 facing the user's eye-side I and a surface S9 facing the object side O on the screen of the display D.

Although not separately shown in the drawings, the lens assembly 200 may further include a filter between the last lens (e.g., the fourth lens L4) from the user's eye-side and the display D. For example, the filter may transmit visible light and block infrared light. For example, the filter may include at least one of a low pass filter or a cover glass. For example, as the filter is mounted, the color that the user feels when seeing the object displayed on the display may be closer to the color that the user feels when seeing the actual object. According to an embodiment, the filter between the fourth lens L4 and the display D may be implemented as the second film portion F2 described above in the embodiment of FIG. 3.

The first lens L1 included in the lens assembly 200 may have at least one surface configured as a flat surface. For example, the first lens L1 may be a plano-concave type lens having a positive refractive power. The first film portion F1 may be attached to the flat surface of the first lens L1. For example, the first film portion may include a first quarter wave plate 103 and a reflective polarizer 102. According to an embodiment, the first quarter wave plate 103 and the reflective polarizer 102 may be laminated and attached to the flat surface. According to an embodiment, the surface S2 facing the user's eye-side I of the first lens L1 may be configured as a flat surface, and the laminated configuration of the first quarter wave plate 103 and the reflective polarizer 102 may be attached thereto (e.g., the embodiment of FIGS. 8 and 9), or the surface S3 facing the object O on the screen of the display D of the first lens L1 may be configured as a flat surface, and the laminated configuration of the first quarter wave plate and the reflective polarizer may be attached thereto (e.g., the embodiment of FIGS. 4 and 5).

The second lens L2 may include at least one convex surface. According to an embodiment, the second lens L2 may be a biconvex lens in which the surface S4 facing the user's eyes and the surface S5 facing the object on the screen of the display D are both convex. Further, the beam splitter 104 may be formed on the convex surface of the second lens L2 so that the light passing through the first lens L1 and incident on the second lens L2 is reflected again and is output toward the first lens L1. For example, the second lens L2 is a biconvex lens having positive refractive power, and may reflect or transmit light by applying a mirror coating functioning to split rays to the surface S5 facing the display D. As such, in the wearable electronic device 100 of the disclosure, the laminated configuration of the first quarter wave plate and the reflective polarizer is attached to at least one surface of the first lens L1, and a mirror coating is applied to the second lens L2, reducing the overall size of the optical system while extending the length of the optical path of incident light.

The wearable electronic device 100 of the disclosure is configured so that the first lens L1 and the second lens L2 are movable with respect to the third lens L3 and the fourth lens L4. The third lens L3 and the fourth lens L4 can be fixed in the wearable electronic device 100. Movement of the first lens L1 and second lens L2 results in vision correction by adjusting the diopter. The wearable electronic device 100 of the disclosure may apply the vision correction function without performance deterioration by moving the first lens L1 and the second lens L2. The third lens L3 and the fourth lens L4 may be configured as a negative lens and a positive lens, respectively. It is possible to effectively correct the axial chromatic aberration and the marginal portion chromatic aberration of magnification by configuring the third lens L3 and the fourth lens L4 with materials having an Abbe's number difference of 30 or more.

The wearable electronic device 100 including the above-described lens assembly 200 may configure an optical system that satisfies formula 1 and formula 2.

$$M12 \geq 0.99 \quad \text{[formula 1]}$$

$$TTL/ImgH \leq 1.75 \quad \text{[formula 2]}$$

Here, M12 may be a combined group magnification of the first lens (first lens L1) and the second lens (second lens L2) on the user's eye-side. TTL may be the distance from the eye-side surface S2 of the first lens (first lens L1) on the side of the user's eyes to the display D, and ImgH may be the maximum image height of the display D. The optical system of the disclosure may assume that the screen output from the display is recognized by the cornea of the user's eye. Therefore, the 'maximum image height' is related to the size of the display D on which an object may be displayed, and may mean half of the diagonal length of the display D. Formula 1 is an equation representing the combined group magnification of the first lens (first lens L1) and the second lens (second lens L2) on the user's eye-side according to the diopter adjustment. If the combined group magnification is smaller than the lower limit, the movement of the lens according to diopter adjustment is increased, causing a significant performance change, with the result of difficulty in adjusting diopter. Formula 2 is an equation for a ratio of the total length (TTL) of the entire optical system and the maximum image height ratio used in the display D. When the value is larger than the upper limit of formula 2, it may be difficult to minimize the size of the optical system.

Further, in the wearable electronic device 100 of the disclosure, the field of view of the entire optical system may meet formula 3 below.

$$80° \leq Fov \leq 100° \quad \text{[formula 3]}$$

Here, field of view (Fov) may be the field of view of the entire optical system.

In the wearable electronic device 100 of the disclosure, all the lenses included in the lens assembly may be configured as plastic aspheric lenses. For example, it is possible to secure performance in an ultra-compact size and advantageously decrease manufacturing costs compared to glass lenses by configuring all of the four lenses as plastic aspheric lenses.

The wearable electronic device 100 of the disclosure is an optical system in which the lens configuration of the entire optical system is configured to have positive, positive, negative, and positive power from the eyes. With this configuration, it is possible to secure a design of an ultra-compact optical system with a wide angle of more than 90 degrees.

In the wearable electronic device 100 of the disclosure, the difference in Abbe's number between the third lens (third lens L3) and the fourth lens (fourth lens L4) from the eye-side may meet formula 4 below.

$$25 \leq |V_4 - V_3| \leq 40 \quad \text{[formula 4]}$$

Here, $V_3$ may be the Abbe's number of the third lens (third lens L3) from the user's eye-side, and $V_4$ may be the Abbe's number of the fourth lens L4 from the user's eye-side. If the upper limit of formula 4 is exceeded, the difference in Abbe's number between positive lens and negative lens is large, so that it is advantageous for correcting chromatic aberration. However, material costs increase, leading to an increase in product costs. Below the lower limit of formula 4, a small difference in Abbe's number causes it difficult to achieve effective chromatic aberration correction.

According to an embodiment, in the wearable electronic device 100, the angle of the chief ray incident from the display to the lens assembly may meet the formula below.

$$D_{CRA} \leq 35° \quad \text{[formula 5]}$$

Here, $D_{CRA}$ may mean the angle of the chief ray incident from the display D to the lens. Here, the chief ray may mean a ray (e.g., light flux) in the middle of a bundle of rays emanating from an end line of the display D. Above the upper limit of conditional equation 5, a significant change in performance occurs when the lens is moved according to diopter adjustment, rendering it impossible to adjust diopter.

Table 1 below shows various lens data of the lens assembly 200 shown in FIGS. 4 and 5, e.g., information about the lens positioned on the light traveling path in the lens assembly 200 including four lenses. 'eye' may mean the subject (e.g., user's eyes). radius may mean the radius of curvature of the lens, thickness the thickness of the lens or air gap, nd the refractive index of the medium (e.g., lens), and vd the Abbe's number of the lens.

Regarding the thickness, the thickness marked on the surface (e.g., S2) of a certain lens (e.g., the first lens L1) facing the user's eye-side I may mean the thickness of the lens, and the thickness marked on the surface (e.g., S3) of a certain lens (e.g., the first lens L1) facing the display-side O may be described as an air gap from the lens to the lens (e.g., the second lens L2) positioned behind along the optical axis direction. In the embodiment of FIGS. 2 and 3, 'S2 to S9' may refer to the user's eye-side (I) or display-side (O) surfaces of the plurality of related lenses (e.g., L1, L2, L3, and L4). For example, 'S1' may be a position considered in design of the lens assembly 200, rather than the actual lens surface. In Table 1 below, '1' marked on the surface may indicate the position of the stop. In the disclosure, the position of the stop in Table 1 may correspond to the pupil inside the user's cornea.

In Table 1, '2 to 16' marked on the surface may indicate the surfaces of the lens, quarter wave plate, reflective polarizer, and/or beam splitter positioned on the light traveling path when the light passes through the plurality of lenses (e.g., L1, L2, L3, and L4). Information about the traveling path of the light passing through the quarter wave plate, reflective polarizer, and/or beam splitter, as well as information about the quarter wave plate, reflective polarizer, and/or beam splitter may be known through Table 1.

For example, '2' on surface may indicate the user's eye-side (I) surface S2 of the first lens L1. '3' on the surface may indicate the display-side (O) surface S3 of the first lens L1 or the reflective polarizer. '4' on the surface may indicate the first quarter wave plate. '5' on the surface may indicate the user's eye-side surface S4 of the second lens L2. '6' on the surface may indicate the display-side (O) surface S5 of the second lens L2 and the beam splitter both. The light passing through the lens assembly 200 of the disclosure may be reflected by the reflective polarizer and/or beam splitter and travel. For example, the light may be reflected from the display-side (O) surface S5 of the second lens L2 to which the beam splitter is applied and then pass through the surface S4 facing the user's eye-side I of the second lens L2 and reach the display-side (O) surface S3 of the first lens L1. The light re-reflected by the display-side (O) surface S3 of the first lens L1 which is laminated and attached with the first quarter wave plate and the reflective polarizer may pass through the surface S4 facing the user's eye-side I of the second lens L2 and the display-side (O) surface S5 of the second lens L2. Information about the refraction and/or reflection of the optical path may be provided through data defined by 6, 7, and 8 on the surface in Table 1 below. As described above, '6' on the surface indicates the display-side (O) surface S5 of the second lens L2 and may include information when the light is reflected by the beam splitter. In Table 1, a negative (–) thickness may mean that light directed in one direction (first direction or second direction) is reflected by the portion (e.g., the display-side (O) surface S5 of the second lens L2) and travels in the opposite direction. '7' on the surface may indicate the user's eye-side (I) surface S4 of the second lens L2 and may include information about the light when the light is reflected by the display-side (O) surface S5 of the second lens L2 and reaches the user's eye-side (I) surface S4. The light which passes through the user's eye-side (I) surface S4 of the second lens L2 and reaches the display-side (O) surface S3 of the first lens L1 may be reflected from the reflective polarizer and propagate toward the second lens L2. In Table 1, '8' on the surface may indicate the reflective polarizer, and '9' on the surface may indicate the user's eye-side (I) surface S4 of the second lens L2. '10' on the surface may indicate the display-side (O) surface S5 of the second lens L2. Thickness DI of '10' on the surface may indicate the distance between the second lens L2 and the third lens L3 when the diopter is 0 and –6 as provided through Table 2 below Table 1. '11' on the surface may indicate the user's eye-side (I) surface S6 of the third lens L3. '12' on the surface may indicate the display-side (O) surface S7 of the third lens L3. '13' on the surface may indicate the user's eye-side (I) surface S8 of the fourth lens L4. '14' on the surface may indicate the display-side (O) surface S9 of the fourth lens L4. '15' on the surface may indicate the user's eye-side (I) surface of the filter. '16' on the surface may indicate the display-side (O) surface of the filter. Here, the filter may be configured as a second film portion including the second quarter wave plate and the second polarizer as described above. 'img' on the surface may indicate an image of an object output on the surface of the display D. Meanwhile, in Table 1 below, the surface marked with along with '2 to 16' marked on the surface may mean that the surface of the lens correspond thereto is formed as an aspheric surface.

The lens assembly 200 included in Table 1 below may relate to a telephoto lens having a field of view (ANG) of 90 degrees or less (half field of view (HFOV) is 45 degrees or less). Further, when the total effective focal length (EFL) is 12.6 mm, the F number (Fno) is about 3.15, and the optical total length from image plane (OTTL) is about 14.91 mm to about 15.95 mm, the lens assembly 200 included in Table 1 may meet the above-described conditions (and/or at least one of the above-described conditions).

TABLE 1

| Surface | Radius | Thickness | EFL | nd | vd |
|---|---|---|---|---|---|
| 1(stop) | Infinity | 12 | | | |
| 2* | 112.84 | 2 | 207.4224 | 1.54401 | 55.91 |
| 3 | Infinity | 0.3 | | 1.5168 | 64.17 |
| 4 | Infinity | 0.3 | | | |
| 5* | 185.06 | 4.5 | 72.8232 | 1.54401 | 55.91 |
| 6* | –49.976 | –4.5 | 15.9713 | –1.54401 | 55.91 |
| 7* | 185.06 | –0.3 | | | |
| 8 | Infinity | 0.3 | | | |
| 9* | 185.06 | 4.5 | 72.8232 | 1.54401 | 55.91 |
| 10* | –49.976 | D1 | | | |
| 11* | –25.601 | 2.445 | –70.5179 | 1.54401 | 55.91 |
| 12* | –79.554 | 0.3 | | | |
| 13* | 32.852 | 2.843 | 19.4882 | 1.63492 | 23.89 |
| 14* | –19.183 | 0.605 | | | |
| 15 | Infinity | 0.25 | | 1.5168 | 64.17 |
| 16 | Infinity | 0.7 | | 1.5168 | 64.2 |
| img | Infinity | 0 | | | |

TABLE 2

| | 0 D | –6 D |
|---|---|---|
| D 1 | 1.34 | 0.3 |

The embodiment of FIGS. 4 and 5 is described again with reference to Tables 1 and 2 above. It may be identified that at 0 diopter, the distance between the second lens L2 and the third lens L3 is 1.34 mm and, at –6 diopters, the distance between the second lens L2 and the third lens L3 is 0.3 mm. Table 3 below shows the aspheric coefficients of the plurality of lenses (e.g., L1, L2, L3, and L4), which may be calculated by formula 6 as follows:

$$z = \frac{c'y^2}{1 + \sqrt{1 - (K+1)c'^2y^2}} + Ay^4 + By^6 + Cy^8 + Dy^{10} + Ey^{12} + Fy^{14} + Gy^{16} + Hy^{18} + Iy^{20}$$

Here, 'z' may mean the distance sag from the vertex of the lens to the optical axis O-I, 'c'' the reciprocal of the radius of curvature at the vertex of the lens, 'y' the distance in the direction perpendicular to the optical axis, 'K' the Conic constant, and 'A,' 'B,' 'C,' 'D,' 'E,' 'F,' 'G,' 'H,' and 'I' the aspheric coefficients. In the numerical values of Table 3 below, 'E and the following number' may denote a power of 10. For example, E+01 may be $10^1$, and E-02 may be $10^{-2}$. In Table 3, '2' on the surface may indicate the user's eye-side (I) surface S2 of the first lens L1. '5, 7, and 9' on the surface are aspheric surfaces for the same surface of substantially the same lens, and may indicate the user's eye-side surface S4 of the second lens L2. '6 and 10' on the surface are also aspheric surfaces for the same surface of substantially the same lens, and may indicate the display-side surface S5 of the second lens L2. '11' on the surface may indicate the user's eye-side surface S6 of the third lens L3. '12' on the surface may indicate the display-side surface S7 of the third lens L3. '13' on the surface may indicate the user's eye-side surface S8 of the fourth lens L4. '14' on the surface may indicate the display-side surface S9 of the fourth lens L4. Referring to Table 3, in the lens assembly 200 The user's eye-side surface S2 of the first lens L1, the user's eye-side surface S4 and display-side surface S5 of the second lens L2, the user's eye-side surface S6 and display-side surface S7 of the third lens L3, and the user's eye-side surface S8 and display-side surface S9 of the fourth lens L4 may be formed as aspheric surfaces.

TABLE 3

| surface | K | A | B | C | D | E | F | G | H |
|---|---|---|---|---|---|---|---|---|---|
| 2 | 0 | 9.82E−06 | 1.52E−07 | −7.23E−09 | 1.04E−10 | −8.59E−13 | 4.16E−15 | −1.10E−17 | 1.23E−20 |
| 5 | 0 | 1.37E−05 | −3.90E−07 | 5.31E−09 | −4.60E−11 | 2.43E−13 | −7.70E−16 | 1.32E−18 | −9.41E−22 |
| 6 | 0 | 1.17E−05 | −1.18E−07 | 1.37E−09 | −1.09E−11 | 5.19E−14 | −1.47E−16 | 2.21E−19 | −1.35E−22 |
| 7 | 0 | 1.37E−05 | −3.90E−07 | 5.31E−09 | −4.60E−11 | 2.43E−13 | −7.70E−16 | 1.32E−18 | −9.41E−22 |
| 9 | 0 | 1.37E−05 | −3.90E−07 | 5.31E−09 | −4.60E−11 | 2.43E−13 | −7.70E−16 | 1.32E−18 | −9.41E−22 |
| 10 | 0 | 1.17E−05 | −1.18E−07 | 1.37E−09 | −1.09E−11 | 5.19E−14 | −1.47E−16 | 2.21E−19 | −1.35E−22 |
| 11 | 0 | 4.92E−04 | −8.78E−06 | 1.56E−07 | −1.82E−09 | 1.34E−11 | −6.21E−14 | 1.71E−16 | −2.20E−19 |
| 12 | 0 | 1.57E−04 | −1.49E−06 | 5.50E−08 | −7.43E−10 | 3.66E−12 | −3.23E−15 | −2.28E−17 | 4.34E−20 |
| 13 | 0 | −3.35E−04 | 9.47E−06 | −1.96E−07 | 2.55E−09 | −1.96E−11 | 8.62E−14 | −1.96E−16 | 1.80E−19 |
| 14 | 0 | 1.35E−03 | −4.54E−05 | 8.62E−07 | −9.15E−09 | 5.20E−11 | −1.20E−13 | −3.69E−17 | 2.05E−19 |

Figure 6A:
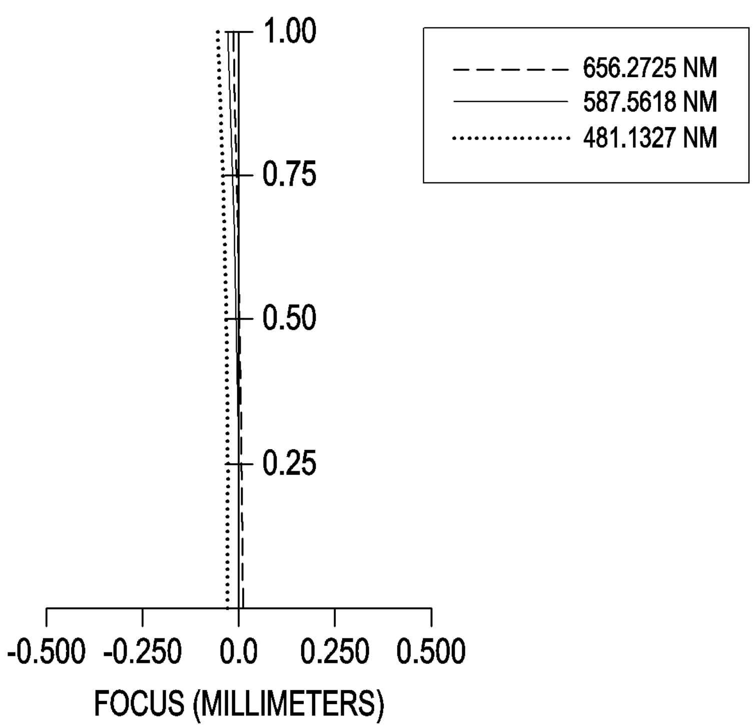
FIG. 6A is a graph illustrating the spherical aberration of a lens assembly according to an embodiment.
Figure 6B:
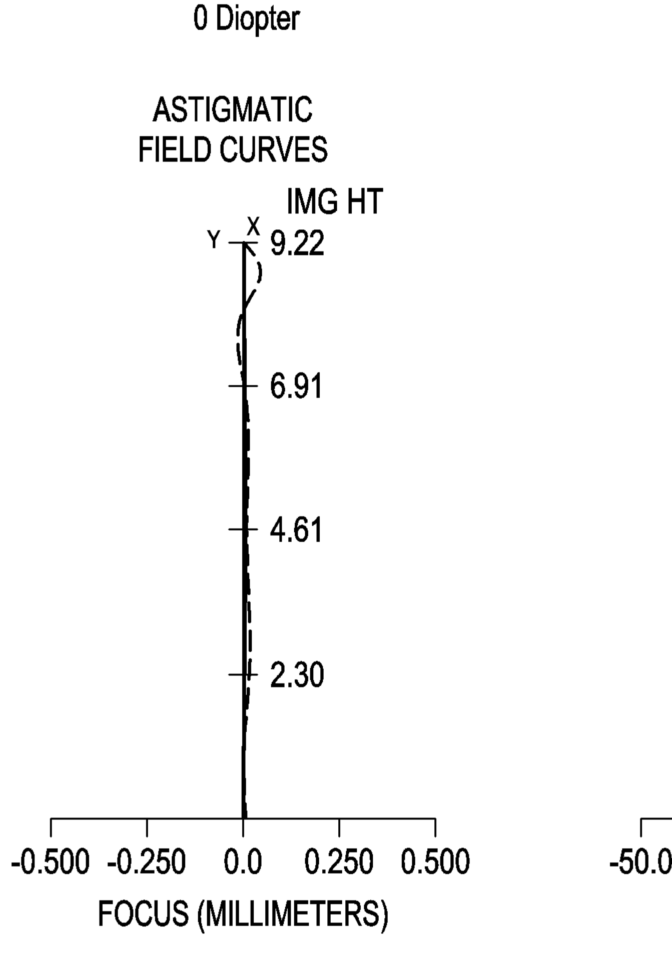
FIG. 6B is a graph illustrating astigmatism of a lens assembly according to an embodiment.
Figure 6C:
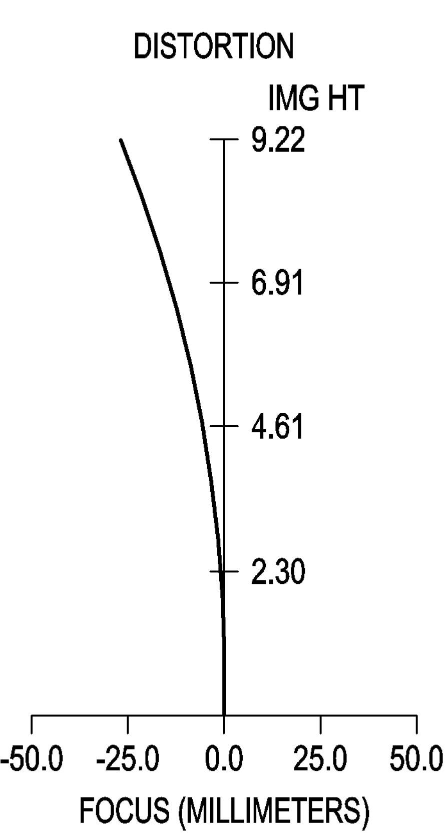
FIG. 6C is a graph illustrating the distortion of a lens assembly according to an embodiment.

FIG. 6A is a graph illustrating the spherical aberration of a lens assembly according to an embodiment. FIG. 6B is a graph illustrating astigmatism of a lens assembly according to an embodiment. FIG. 6C is a graph illustrating the distortion of a lens assembly according to an embodiment. FIGS. 6A to 6C may show the aberrations of the lens assembly when the diopter is 0 (e.g., the embodiment of FIG. 4).

Figure 7A:
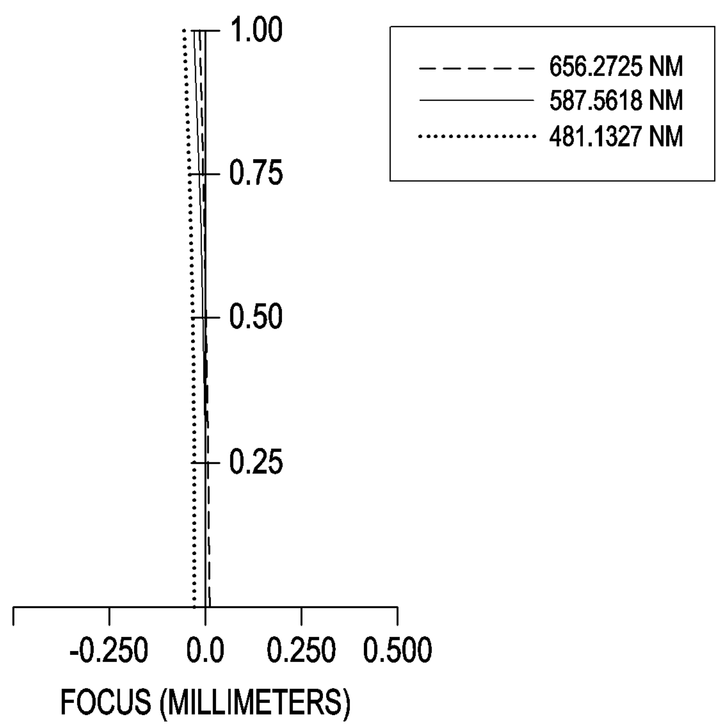
FIG. 7A is a graph illustrating the spherical aberration of a lens assembly according to an embodiment.
Figures 7B, 7C:
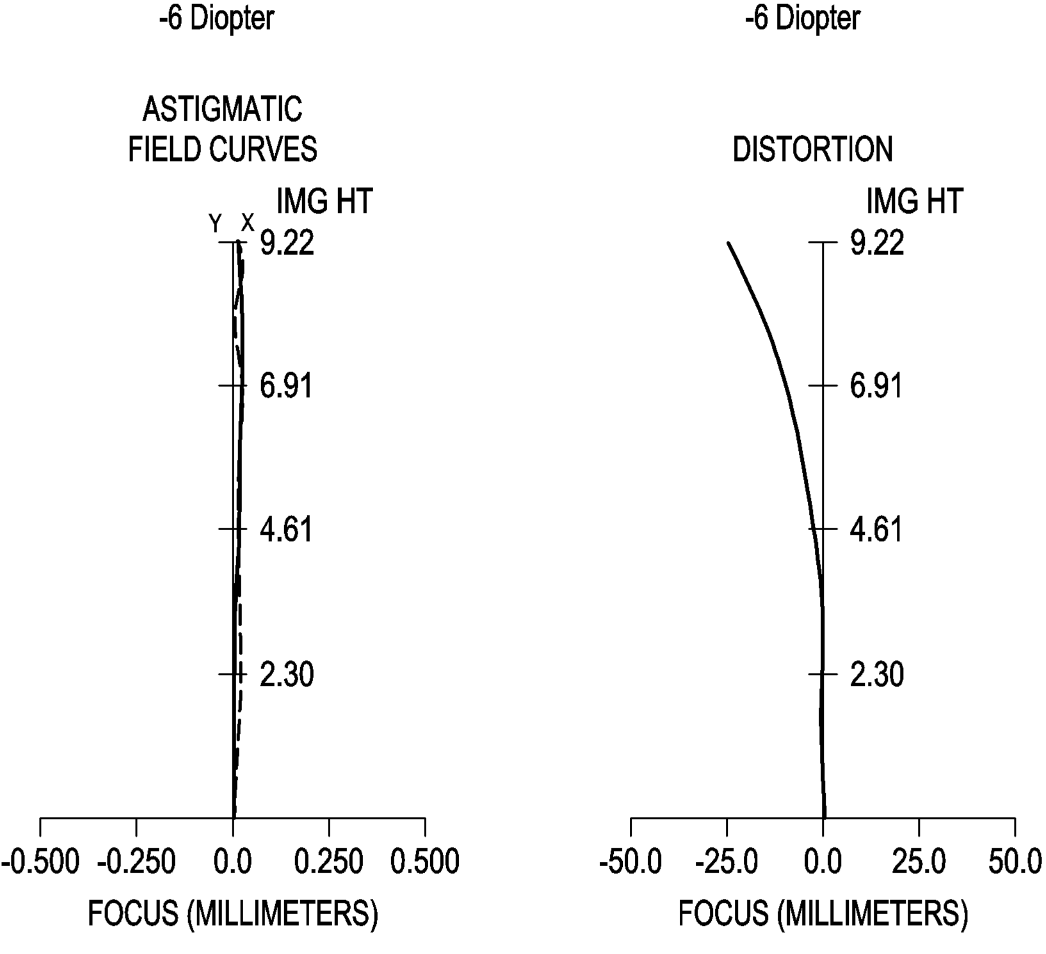
FIG. 7B is a graph illustrating astigmatism of a lens assembly according to an embodiment.
FIG. 7C is a graph illustrating astigmatism of a lens assembly according to an embodiment.

FIG. 7A is a graph illustrating the spherical aberration of a lens assembly according to an embodiment. FIG. 7B is a graph illustrating astigmatism of a lens assembly according to an embodiment. FIG. 7C is a graph illustrating astigmatism of a lens assembly according to an embodiment. FIGS. 7A to 7C may show the aberrations of the lens assembly when the diopter is −6 (e.g., the embodiment of FIG. 5).

FIGS. 6A and 7A are graphs illustrating spherical aberration of the lens assembly 200, according to an embodiment of the disclosure. Spherical aberration may refer to the phenomenon that light beams passing through different portions (e.g., the chief portion and the marginal portion) of the lens are focused on different positions.

In FIGS. 6A and 7A, the horizontal axis refers to the degree of longitudinal spherical aberration, and the vertical axis refers to the result of normalization of the distance from the center of the optical axis. FIG. 2 may illustrate variations in longitudinal spherical aberration depending on light wavelengths. The longitudinal spherical aberration may be shown for each of light beams whose wavelengths are about 656.2725 nanometers (nm), about 587.5618 nm, or about 486.1327 nm. Referring to FIGS. 6A and 7A, in a visible light range, the longitudinal spherical aberration of the lens assembly, according to an embodiment of the disclosure, may be limited to be within a range from about +0.050 to −0.050 so that stable optical properties are shown, except for the light having a wavelength of 481.1327 nm.

FIGS. 6B and 7B are graphs illustrating astigmatism of the lens assembly 200, according to an embodiment of the disclosure. Astigmatism may refer to a deviation between the focuses of the light beams passing in the vertical and horizontal directions when the tangential plane or meridian plane of the lens has a different radius from the radius of the sagittal plane of the lens. Here, the tangential plane may be a surface including a curve on the lens positioned in a direction substantially perpendicular to the optical axis from the vertex of the lens, and the sagittal plane may be a surface including a curve on the lens positioned in a second direction substantially perpendicular to the optical axis from the vertex of the lens. In FIGS. 6B and 7B, the vertical axis IMG HT may denote the image height. Here, the image height may mean the maximum distance from the optical axis O-I to the edge of the display D (half of the diagonal length of the display screen of the display D).

In FIGS. 6B and 7B, the astigmatism of the lens assembly 200 is the result obtained at a wavelength of about 587.5618 nm, wherein the dashed line Y may denote the astigmatism in the tangential plane direction (e.g., tangential field curvature), and the solid line X may denote the astigmatism in the sagittal plane direction (e.g., sagittal field curvature). It can be identified from FIGS. 6B and 7B that the astigmatism may be limited to a range from about +0.050 to −0.050 so that stable optical properties may be shown according to an embodiment of the disclosure.

FIGS. 6C and 7C are graphs illustrating distortion of the lens assembly 200, according to an embodiment of the disclosure. Distortion occurs because the optical magnification varies depending on the distance from the optical axis O-I. As compared with an image forming on a theoretical imaging plane, an image forming on the actual imaging plane may be shown to be larger or smaller by distortion.

FIGS. 6C and 7C show the results of distortion of the lens assembly 200, which are obtained in a wavelength of about 587.5618 nm. The image captured by the lens assembly 200 may cause distortion at a point (e.g., marginal portion) off the optical axis O-I. However, the distortion is a degree that may commonly occur in an optical device using a lens, and the lens assembly 200 according to one of certain embodiments of the disclosure has a distortion rate of less than about ±25% and may provide good optical properties.

The description of the lens assembly 200 according to the foregoing embodiments may apply to lens assemblies 200 and 300 described below according to another embodiment. Some of the plurality of lens assemblies 200 and 300 may have the same lens attribute (e.g., field of view, focal length, auto-focusing, f number, or optical zoom), or at least one lens assembly may have one or more lens attributes different from those of another lens assembly.

In describing the following embodiment of the disclosure, the same or similar, or no reference characters are given for components which may readily be appreciated from the above-described embodiments. No detailed description thereof is presented below as long as it overlaps the above description.

Figure 8:
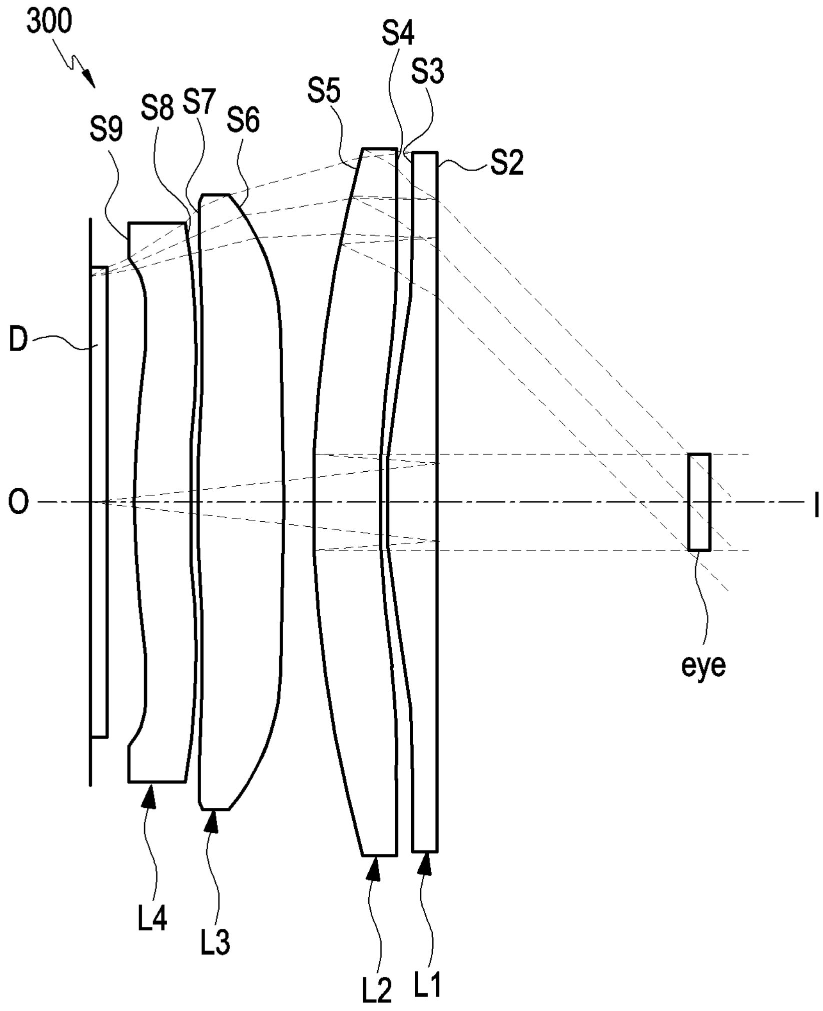
FIG. 8 is a view illustrating a lens assembly according to an embodiment.
Figure 9:
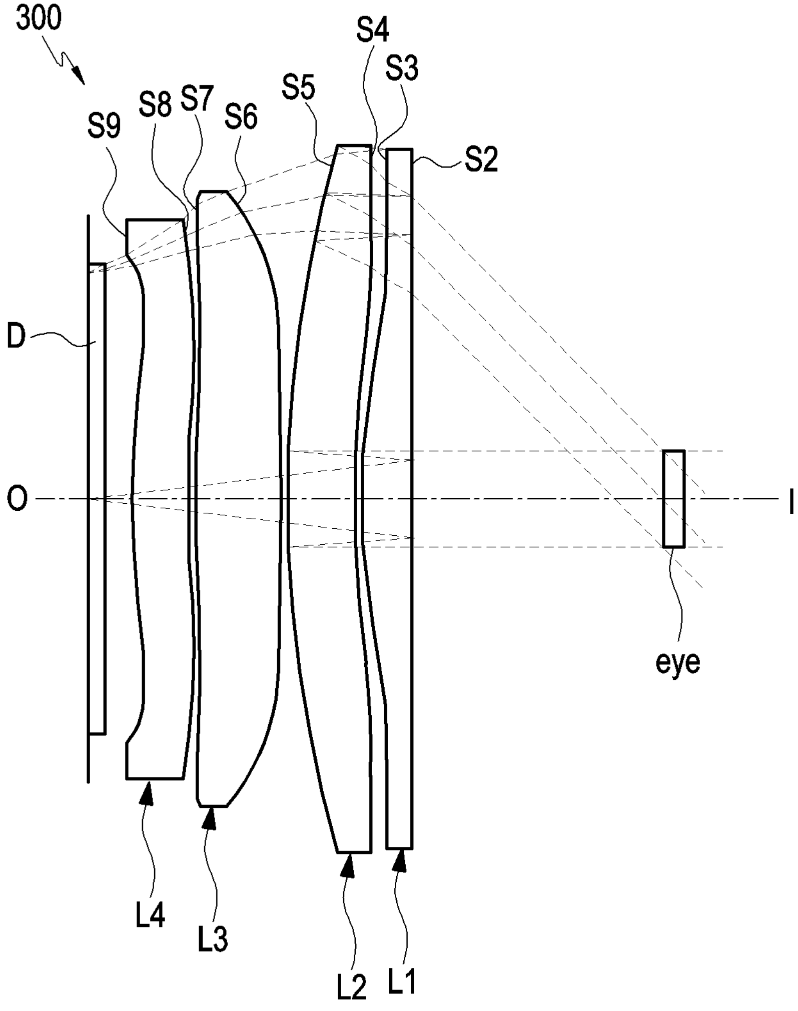
FIG. 9 is a view illustrating a lens assembly according to an embodiment.

FIG. 8 is a view illustrating a lens assembly according to an embodiment. FIG. 9 is a view illustrating a lens assembly according to an embodiment. FIG. 8 may illustrate the lens assembly 300 when the diopter is 0, and FIG. 9 may illustrate the lens assembly 300 when the diopter is −6.

Referring to FIGS. 8 and 9, according to an embodiment of the disclosure, a lens assembly 300 may include a plurality of lenses (e.g., L1, L2, L3, and L4). Here, the lens assembly 300 according to the embodiment of FIGS. 8 and 9, unlike the embodiment of FIGS. 4 and 5, may be shaped so that the user's eye-side (I) surface S2 of the first lens L1 is flat, and the surface S3 facing the object O on the screen on the display D of the first lens L1 is convex. Further, according to an embodiment, the second lens L2 may be shaped so that the surface S5 facing the object O on the screen on the display D is convex, and the user's eye-side (I) surface is concave.

Tables 4 and 5 below may represent various lens data about the lens assembly 300 according to the embodiment of FIGS. 8 and 9. Table 6 below may show data for defining the aspheric coefficients of the plurality of lenses (e.g., L1, L2, L3, and L4).

In Table 4, '2 to 18' marked on the surface may indicate the surface of the lens, quarter wave plate, reflective polarizer, and/or beam splitter positioned on the light traveling path when the light passes through the plurality of lenses (e.g., L1, L2, L3, and L4). Information about the traveling path of the light passing through the quarter wave plate, reflective polarizer, and/or beam splitter, as well as information about the quarter wave plate, reflective polarizer, and/or beam splitter may be known through Table 4.

For example, '2' on the surface may indicate the reflective polarizer. '3' on the surface may indicate the first quarter wave plate and the user's eye-side surface S2 of the first lens L1. '4' on the surface may indicate the display-side (O) surface S3 of the first lens L1. '5' on the surface may indicate the user's eye-side surface S4 of the second lens L2. '6' on the surface may indicate the display-side (O) surface S5 of the second lens L2 and the beam splitter both. The light passing through the lens assembly 300 of the disclosure may be reflected by the reflective polarizer and/or beam splitter and travel. For example, the light may be reflected from the display-side (O) surface S5 of the second lens L2 formed with the beam splitter and then pass through the surface S4 facing the user's eye-side I of the second lens L2 and the display-side (O) surface S3 of the first lens L1 and reach the user's eye-side (I) surface S2 of the first lens L1. The light re-reflected by the user's eye-side (I) surface S2 of the first lens L1 which is laminated and attached with the first quarter wave plate and the reflective polarizer may pass through the display-side (O) surface S3 of the first lens L1, the surface S4 facing the user's eye-side I of the second lens L2 and the display-side (O) surface S5 of the second lens L2. Information about the refraction and/or reflection of the optical path may be provided through data defined by 6, 7, and 8 on the surface in Table 4 below. In other words, '6' on the surface may indicate the display-side (O) surface S5 of the second lens L2 and may also indicate information about the light reflected from the beam splitter and passing through the second lens L2. '7' on the surface may indicate the user's eye-side surface S4 of the second lens L2 and indicate information about the light that is reflected from the beam splitter, passes through the second lens L2, and then reaches the display-side (O) surface S3 of the first lens L1. '8' on the surface may indicate the display-side (O) surface S3 of the first lens L1 and indicate information about the light until the light reaches the user-side (O) surface S2 of the first lens L1. '9' on the surface may indicate the reflective polarizer and it may be identified here that the light is reflected once again. '10' on the surface may indicate the display-side (O) surface S3 of the first lens L1, '11' on the surface may indicate the user-side surface S4 of the second lens L2, and '12' on the surface may indicate the display-side surface S5 of the second lens L2. Further, '13' on the surface may indicate the user's eye-side (I) surface S6 of the third lens L3. '14' on the surface may indicate the display-side (O) surface S7 of the third lens L3. '15' on the surface may indicate the user's eye-side (O) surface S8 of the fourth lens L4. '16' on the surface may indicate the display-side (O) surface S9 of the fourth lens L4. '17' on the surface may indicate the user's eye-side (I) surface of the filter. '18' on the surface may indicate the display-side (O) surface of the filter. Here, the filter may be configured as a second film portion including the second quarter wave plate and the second polarizer as described above. 'img' on the surface may indicate an image of an object output on the surface of the display D. Meanwhile, in Table 4 below, the surface marked with '*' along with '2 to 18' marked on the surface may mean that the surface of the lens opposite thereto is formed as an aspheric surface.

The lens assembly 200 included in Table 4 below may relate to a telephoto lens having a field of view (ANG) of 90 degrees or less (half field of view (HFOV) is 45 degrees or less). Further, when the total effective focal length (EFL) is 12.8 mm, the F number (Fno) is about 3.2, and the optical total length from image plane (OTTL) is about 13.95 mm to about 15 mm, the lens assembly 200 included in Table 4 may meet the above-described conditions (and/or at least one of the above-described conditions).

TABLE 4

| Surface | Radius | Thickness | EFL | nd | vd |
|---|---|---|---|---|---|
| 1(stop) | Infinity | 10 | | | |
| 2 | Infinity | 0.3 | | 1.5168 | 64.17 |
| 3 | Infinity | 2 | 49.1563 | 1.5348 | 55.71 |
| 4* | −26.289 | 0.3 | | | |
| 5* | −30.269 | 2.713 | −154.6325 | 1.54401 | 55.91 |
| 6* | −48.775 | −2.713 | −41.3446 | −1.54401 | 55.91 |
| 7* | −30.269 | −0.3 | | | |
| 8* | −26.289 | −2 | 10.3711 | −1.5348 | 55.71 |
| 9 | Infinity | 2 | 49.1563 | 1.5348 | 55.71 |
| 10* | −26.289 | 0.3 | | | |
| 11* | −30.269 | 2.713 | −154.6325 | 1.54401 | 55.91 |
| 12* | −48.775 | D1 | | | |
| 13* | 302.505 | 3.5 | 72.6894 | 1.63492 | 23.89 |
| 14* | −54.217 | 0.3 | | | |
| 15* | −46.298 | 2.421 | 312.3564 | 1.5348 | 55.71 |
| 16* | −36.912 | 0.845 | | | |
| 17 | Infinity | 0.25 | | 1.5168 | 64.17 |
| 18 | Infinity | 0.7 | | 1.5168 | 64.2 |
| img | Infinity | 0 | | | |

TABLE 5

| | 0 D | −6 D |
|---|---|---|
| D 1 | 1.38 | 0.3 |

The embodiment of FIGS. 8 and 9 is described again with reference to Tables 4 and 5 above. It may be identified that at 0 diopter, the distance between the second lens L2 and the third lens L3 is 1.38 mm and, at −6 diopters, the distance between the second lens L2 and the third lens L3 is 0.3 mm.

In Table 6 below, '4, 8, and 10' on the surface are aspheric surfaces for the same surface of substantially the same lens, and may indicate the display-side surface S3 of the first lens L1. '5, 7, and 11' on the surface may indicate the user-side surface S4 of the second lens L2. '6 and 12' on the surface may indicate the display-side surface S5 of the second lens L2. '13' on the surface may indicate the user's eye-side surface S6 of the third lens L3. '14' on the surface may indicate the display-side surface S7 of the third lens L3. '15' on the surface may indicate the user's eye-side surface S8 of the fourth lens L4. '16' on the surface may indicate the display-side surface S9 of the fourth lens L4. Referring to Table 6, in the lens assembly 200 according to an embodiment, the display-side surface S3 of the first lens L1, the user's eye-side surface S4 and display-side surface S5 of the second lens L2, the user's eye-side surface S6 and display-side surface S7 of the third lens L3, and the user's eye-side surface S8 and display-side surface S9 of the fourth lens L4 may be formed as aspheric surfaces.

TABLE 6

| surface | K | A | B | C | D | E | F |
|---|---|---|---|---|---|---|---|
| 4 | 0 | 9.34E−05 | 3.28E−08 | −2.26E−11 | −1.04E−12 | −1.83E−14 | 5.16E−17 |
| 5 | 0 | 1.29E−04 | −2.29E−07 | −5.30E−10 | −7.06E−14 | 1.20E−14 | −2.55E−17 |
| 6 | 0 | 1.61E−05 | −6.35E−08 | −4.35E−11 | 5.77E−13 | −3.49E−15 | 1.36E−17 |
| 7 | 0 | 1.29E−04 | −2.29E−07 | −5.30E−10 | −7.06E−14 | 1.20E−14 | −2.55E−17 |
| 8 | 0 | 9.34E−05 | 3.28E−08 | −2.26E−11 | −1.04E−12 | −1.83E−14 | 5.16E−17 |
| 10 | 0 | 9.34E−05 | 3.28E−08 | −2.26E−11 | −1.04E−12 | −1.83E−14 | 5.16E−17 |
| 11 | 0 | 1.29E−04 | −2.29E−07 | −5.30E−10 | −7.06E−14 | 1.20E−14 | −2.55E−17 |
| 12 | 0 | 1.61E−05 | −6.35E−08 | −4.35E−11 | 5.77E−13 | −3.49E−15 | 1.36E−17 |
| 13 | 0 | −2.67E−06 | 4.49E−07 | 2.93E−09 | −1.72E−11 | 2.66E−14 | −1.27E−16 |
| 14 | 0 | 8.31E−05 | 3.72E−07 | −4.84E−09 | 6.53E−13 | 9.49E−14 | −2.95E−16 |
| 15 | 0 | 6.77E−05 | 8.19E−07 | 1.82E−09 | −8.37E−11 | 2.85E−13 | 0.00E+00 |
| 16 | 0 | −2.15E−04 | 1.04E−05 | −1.61E−07 | 1.39E−09 | −4.48E−12 | 0.00E+00 |

According to an embodiment, the lens assemblies 200 and 300 according to various embodiments of the disclosure may have values meeting each formula as shown in Table 7 below.

TABLE 7

| | embodiment of FIGS. 4 and 5 | embodiment of FIGS. 8 and 9 |
|---|---|---|
| formula 1 | 1.0 | 1.0 |
| formula 2 | 1.7 | 1.63 |
| formula 3 | 89.5 | 89.5 |
| formula 4 | 32.02 | 31.8 |
| formula 5 | 33 | 18 |

Figure 10A:
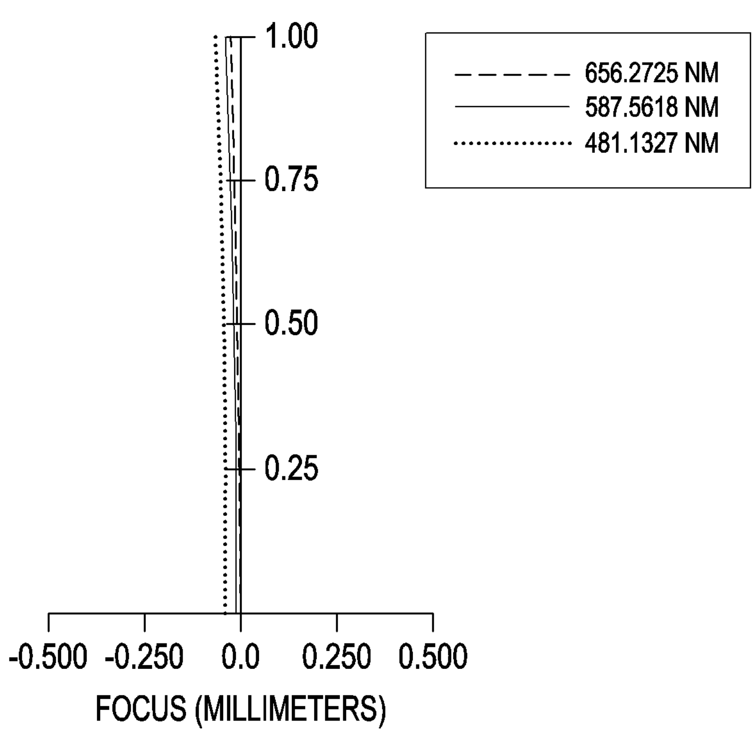
FIG. 10A is a graph illustrating the spherical aberration of a lens assembly according to an embodiment.
Figures 10B, 10C:
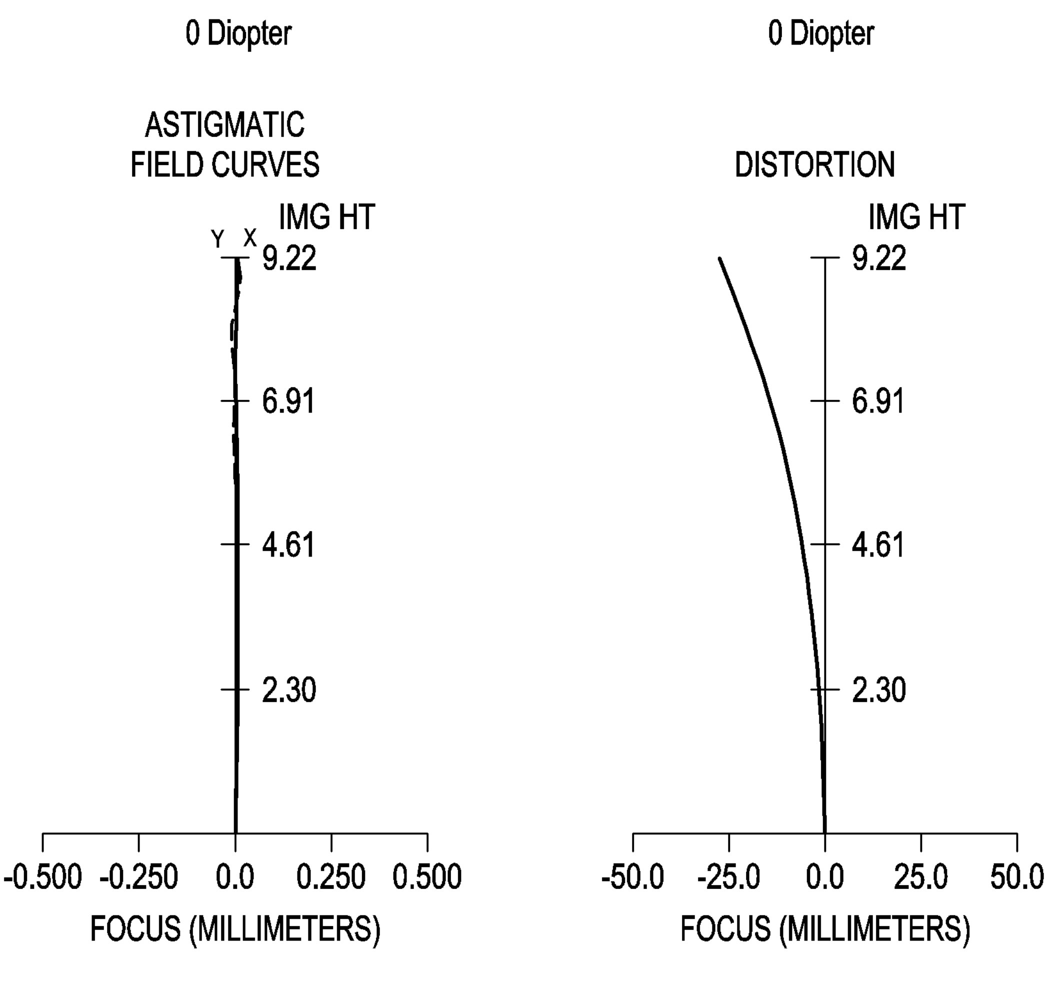
FIG. 10B is a graph illustrating astigmatism of a lens assembly according to an embodiment.
FIG. 10C is a graph illustrating the distortion of a lens assembly according to an embodiment.
Figure 11A:
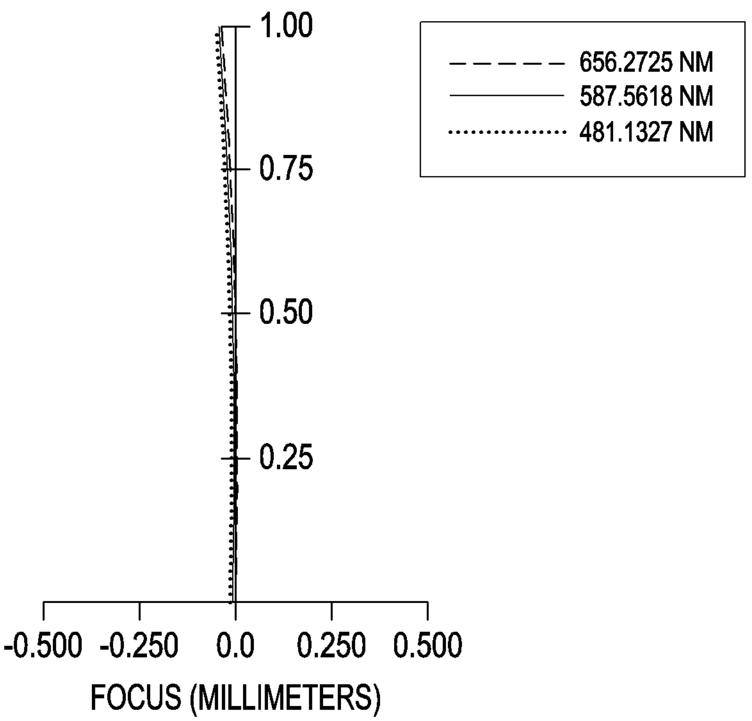
FIG. 11A is a graph illustrating the spherical aberration of a lens assembly according to an embodiment.
Figures 11B, 11C:
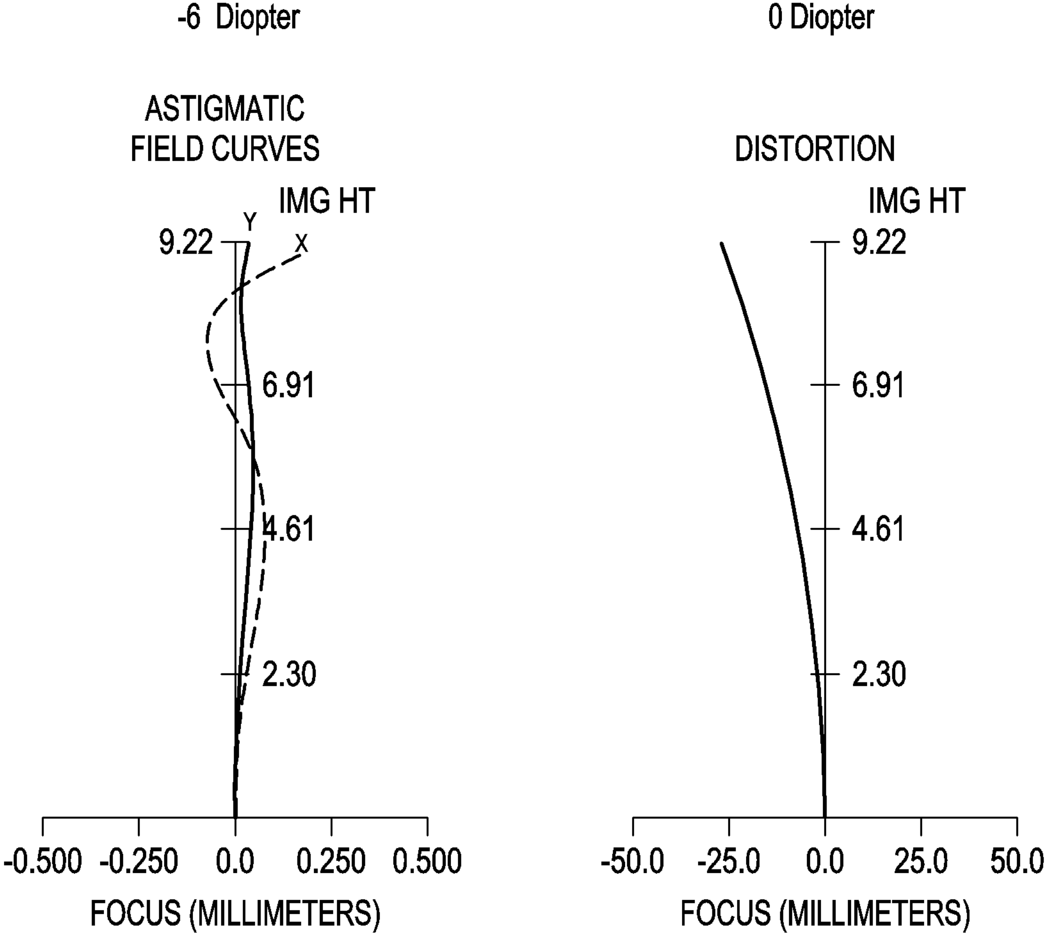
FIG. 11B is a graph illustrating astigmatism of a lens assembly according to an embodiment.
FIG. 11C is a graph illustrating astigmatism of a lens assembly according to an embodiment.

FIG. 10A is a graph illustrating the spherical aberration of a lens assembly according to an embodiment. FIG. 10B is a graph illustrating astigmatism of a lens assembly according to an embodiment. FIG. 10C is a graph illustrating the distortion of a lens assembly according to an embodiment. FIG. 11A is a graph illustrating the spherical aberration of a lens assembly according to an embodiment. FIG. 11B is a graph illustrating astigmatism of a lens assembly according to an embodiment. FIG. 11C is a graph illustrating astigmatism of a lens assembly according to an embodiment.

FIGS. 10A and 11A are graphs illustrating spherical aberration of the lens assembly 300, according to an embodiment of the disclosure. Spherical aberration may refer to the phenomenon that light beams passing through different portions (e.g., the chief portion and the marginal portion) of the lens are focused on different positions.

In FIGS. 10A and 11A, the horizontal axis refers to the degree of longitudinal spherical aberration, and the vertical axis refers to the result of normalization of the distance from the center of the optical axis. FIG. 2 may illustrate variations in longitudinal spherical aberration depending on light wavelengths. The longitudinal spherical aberration may be shown for each of light beams whose wavelengths are about 656.2725 nanometers (nm), about 587.5618 nm, or about 486.1327 nm. Referring to FIGS. 10A and 11A, in a visible light range, the longitudinal spherical aberration of the lens assembly, according to an embodiment of the disclosure, may be limited to be within a range from about +0.050 to −0.050 so that stable optical properties are shown, except for the light having a wavelength of 481.1327 nm.

FIGS. 10B and 11B are graphs illustrating astigmatism of the lens assembly 300, according to an embodiment of the disclosure. Astigmatism may refer to a deviation between the focuses of the light beams passing in the vertical and horizontal directions when the tangential plane or meridian plane of the lens has a different radius from the radius of the sagittal plane of the lens. Here, the tangential plane may be a surface including a curve on the lens positioned in a direction substantially perpendicular to the optical axis from the vertex of the lens, and the sagittal plane may be a surface including a curve on the lens positioned in a second direction substantially perpendicular to the optical axis from the vertex of the lens. In FIGS. 10B and 11B, the vertical axis IMG HT may denote the image height. Here, the image height may mean the maximum distance from the optical axis O-I to the edge of the display D (half of the diagonal length of the display screen of the display D).

In FIGS. 10B and 11B, the astigmatism of the lens assembly 300 is the result obtained at a wavelength of about 587.5618 nm, wherein the dashed line Y may denote the astigmatism in the tangential plane direction (e.g., tangential field curvature), and the solid line X may denote the astigmatism in the sagittal plane direction (e.g., sagittal field curvature). It can be identified from FIG. 10B that the astigmatism may be limited to a range from about +0.050 to −0.050 so that stable optical properties may be shown according to an embodiment of the disclosure. As may be identified through FIG. 11B, even in the state of −6 diopter, astigmatism may be limited within about +0.200 to −0.200.

FIGS. 10C and 11C are graphs illustrating distortion of the lens assembly 300, according to an embodiment of the disclosure. Distortion occurs because the optical magnification varies depending on the distance from the optical axis O-I. As compared with an image forming on a theoretical imaging plane, an image forming on the actual imaging plane may be shown to be larger or smaller by distortion.

FIGS. 10C and 11C show the results of distortion of the lens assembly 300, which are obtained in a wavelength of about 587.5618 nm. The image captured by the lens assembly 300 may cause distortion at a point (e.g., marginal portion) off the optical axis O-I. However, the distortion is a degree that may commonly occur in an optical device using a lens, and the lens assembly 300 according to one of various embodiments of the disclosure has a distortion rate of less than about ±25% and may provide good optical properties.

In certain embodiments, the wearable electronic device can include an electronic device that is capable of being fastened to the body of the person. The electronic device can include various components as described below.

Figure 12:
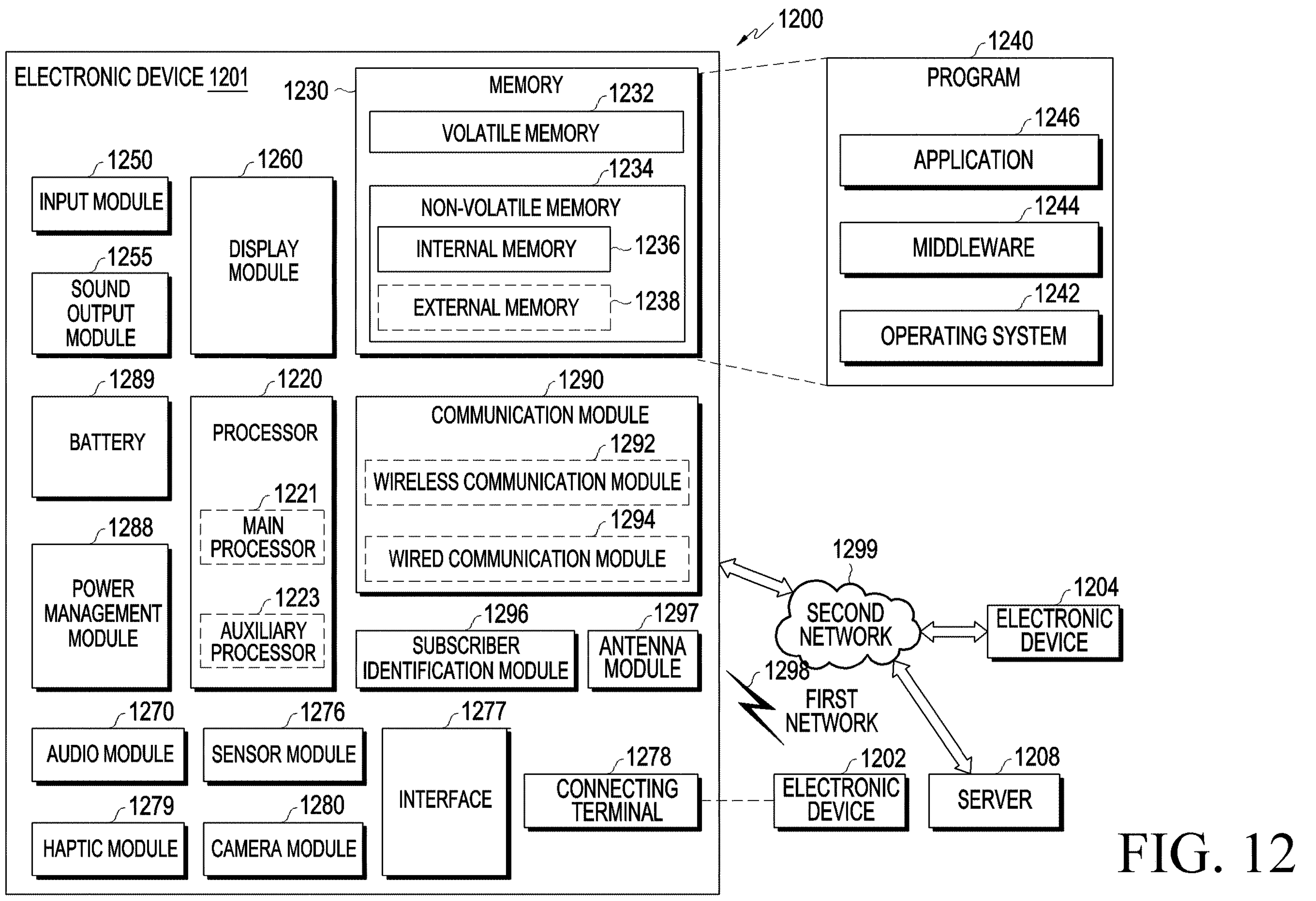
FIG. 12 is a block diagram illustrating an electronic device in a network environment according to various embodiments.

FIG. 12 is a block diagram illustrating an electronic device 1201 (e.g., the electronic device 100 of FIG. 1) (e.g., optical device) in a network environment 1200 according to various embodiments.

Referring to FIG. 12, the electronic device 1201 (e.g., an optical device in the network environment 1200 may communicate with at least one of an electronic device 1202 via a first network 1298 (e.g., a short-range wireless communication network), or an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments, at least one (e.g., the display device 1260 or the camera module 1280) of the components may be omitted from the electronic device 1201, or one or more other components may be added in the electronic device 101. According to an embodiment, some (e.g., the sensor module 1276, the camera module 1280, or the antenna module 1297) of the components may be integrated into a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to an embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 1201 includes the main processor 1221 and the auxiliary processor 1223, the auxiliary processor 1223 may be configured to use lower power than the main processor 1221 or to be specified for a designated function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 123. According to an embodiment, the auxiliary processor 1223 (e.g., the neural processing unit) may include a hardware structure specified for artificial intelligence model processing. The artificial intelligence model may be generated via machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by other component (e.g., the processor 1220) of the electronic device 1201, from the outside (e.g., a user) of the electronic device 1201. The input module 1250 may include, for example, a microphone, a mouse, a keyboard, keys (e.g., buttons), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display 1260 may include, for example, a display, a hologram device, or a projector and control circuitry to control a corresponding one of the display, hologram device, and projector. According to an embodiment, the display 1260 may include a touch sensor configured to detect a touch, or a pressure sensor configured to measure the intensity of a force generated by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 101, and then generate an electrical signal or data value corresponding to the detected state. According to an embodiment, the sensor module 1276 may include, for example, a gesture sensor, a gyro sensor, an atmospheric pressure sensor, a magnetic sensor, an accelerometer, a grip sensor, a proximity sensor, a color sensor, an infrared (IR)

sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or motion) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to an embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device 1204 via a first network 1298 (e.g., a short-range communication network, such as Bluetooth™, wireless-fidelity (Wi-Fi) direct, or infrared data association (IrDA)) or a second network 1299 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 1292 may identify or authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lms or less) for implementing URLLC.

The antenna module 1297 may transmit or receive a signal or power to or from the outside (e.g., the external electronic device). According to an embodiment, the antenna module 1297 may include one antenna including a radiator formed of a conductor or conductive pattern formed on a substrate (e.g., a printed circuit board (PCB)). According to an embodiment, the antenna module 1297 may include a plurality of antennas (e.g., an antenna array). In this case, at least one antenna appropriate for a communication scheme used in a communication network, such as the first network 1298 or the second network 1299, may be selected from the plurality of antennas by, e.g., the communication module 1290. The signal or the power may then be transmitted or received between the communication module 1290 and the external electronic device via the selected at least one antenna. According to an embodiment, other parts (e.g., radio frequency integrated circuit (RFIC)) than the radiator may be further formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. The external electronic devices 1202 and 1204 each may be a device of the same or a different type from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example.

The electronic device 1201 may provide ultra low-latency services using, e.g., distributed computing or mobile edge computing. In another embodiment, the external electronic device 1204 may include an Internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or health-care) based on 5G communication technology or IoT-related technology.

Figure 13:
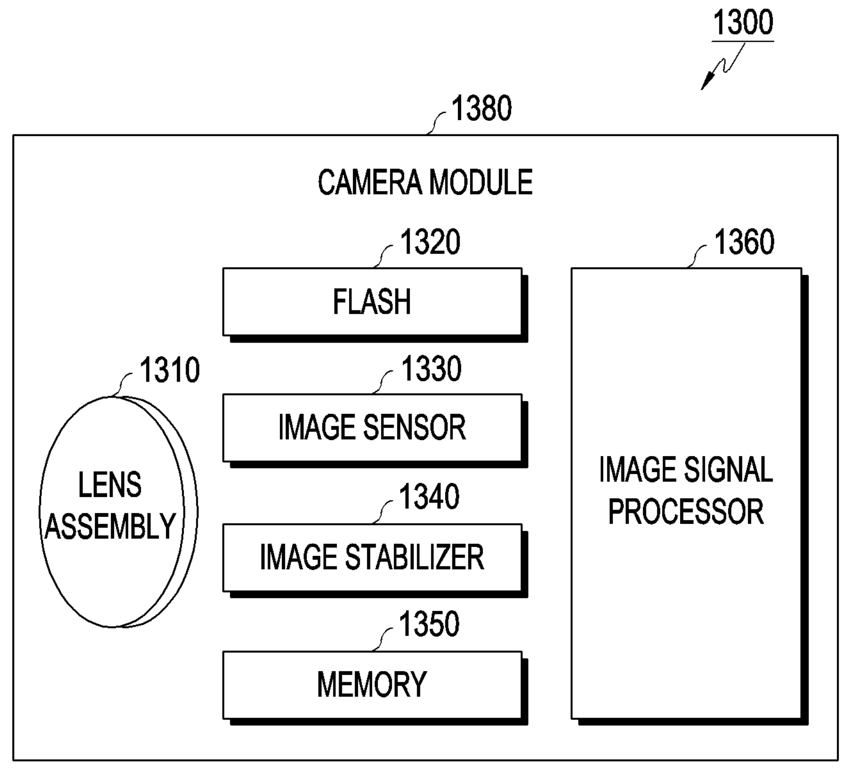
FIG. 13 is a block diagram illustrating an example of a camera module according to various embodiments.

FIG. 13 is a block diagram 1300 illustrating the camera module 1380 according to various embodiments.

Referring to FIG. 13, the camera module 1380 may include a lens assembly 1310 (e.g., 200 or 300), a flash 1320, an image sensor 1330 (e.g., IS), an image stabilizer 1340, memory 1350 (e.g., buffer memory (e.g., the memory 1230 of FIG. 12)), or an image signal processor 1360. The lens assembly 1310 may collect light emitted or reflected from an object whose image is to be taken. The lens assembly 1310 may include one or more lenses. According to an embodiment, the camera module 1380 may include a plurality of lens assemblies 1310. In such a case, the camera module 1380 may form, for example, a dual camera, a 360-degree camera, or a spherical camera. Some of the plurality of lens assemblies 1310 may have the same lens attribute (e.g., view angle, focal length, auto-focusing, f number (Fno), or optical zoom), or at least one lens assembly may have one or more lens attributes different from those of another lens assembly. The lens assembly 1310 may include, for example, a wide-angle lens or a telephoto lens.

The flash 1320 may emit light that is used to reinforce light reflected from an object. According to an embodiment, the flash 1320 may include one or more light emitting diodes (LEDs) (e.g., a red-green-blue (RGB) LED, a white LED, an infrared (IR) LED, or an ultraviolet (UV) LED) or a xenon lamp. The image sensor 1330 may obtain an image corresponding to an object by converting light emitted or reflected from the object and transmitted via the lens assembly 1310 into an electrical signal. According to an embodiment, the image sensor 1330 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1330 may be implemented using, for example, a charged coupled device (CCD) sensor or a complementary metal oxide semiconductor (CMOS) sensor.

The image stabilizer 1340 may move the image sensor 1330 or at least one lens included in the lens assembly 1310 in a particular direction, or control an operational attribute (e.g., adjust the read-out timing) of the image sensor 1330 in response to the movement of the camera module 1380 or the electronic device 1201 including the camera module 180. This allows compensating for at least part of a negative effect (e.g., image blurring) by the movement on an image being captured. According to an embodiment, the image stabilizer 1340 may sense such a movement by the camera module 1380 or the electronic device 1201 using a gyro sensor (not shown) or an acceleration sensor (not shown) disposed inside or outside the camera module 1380. According to an embodiment, the image stabilizer 1340 may be implemented, for example, as an optical image stabilizer. The memory 1350 may store, at least temporarily, at least part of an image obtained via the image sensor 1330 for a subsequent image processing task. For example, if image capturing is delayed due to shutter lag or multiple images are quickly captured, a raw image obtained (e.g., a Bayer-patterned image, a high-resolution image) may be stored in the memory 1350, and its corresponding copy image (e.g., a low-resolution image) may be previewed via the display device 1260. Thereafter, if a specified condition is met (e.g., by a user's input or system command), at least part of the raw image stored in the memory 1350 may be obtained and processed, for example, by the image signal processor 1360. According to an embodiment, the memory 1350 may be configured as at least part of the memory 1230 of FIG. 12 or as a separate memory that is operated independently from the memory.

The image signal processor 1360 may perform one or more image processing with respect to an image obtained via the image sensor 1330 or an image stored in the memory 1350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1360 may perform control (e.g., exposure time control or read-out timing control) with respect to at least one (e.g., the image sensor 1330) of the components included in the camera module 1380. An image processed by the image signal processor 1360 may be stored back in the memory 1350 for further processing, or may be provided to an external component (e.g., the memory 1230, the display device 1260, the electronic device 1202, the electronic device 1204, or the server 1208) outside the camera module 1380. According to an embodiment, the image signal processor 1360 may be configured as at least part of the processor 1220, or as a separate processor that is operated independently from the processor 1220. If the image signal processor 1360 is configured as a separate processor from the processor 1220, at least one image processed by the image signal processor 1360 may be displayed, by the processor 1360, via the display device 1360 as it is or after being further processed.

According to an embodiment, the electronic device 1201 may include a plurality of camera modules 1380 having different attributes or functions. In such a case, at least one of the plurality of camera modules 1380 may form, for example, a wide-angle camera and at least another of the plurality of camera modules 180 may form a telephoto camera. Similarly, at least one of the plurality of camera modules 1380 may form, for example, a front camera and at least another of the plurality of camera modules 180 may form a rear camera.

The electronic device according to various embodiments may be one of various types of devices. The electronic devices may include, for example, a portable communication device (e.g., a smartphone), a computer device, a portable multimedia device, a portable medical device, a camera, a wearable device, or a home appliance. According to an embodiment of the present invention, the electronic device is not limited to the above-listed embodiments.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, an wearable electronic device 100 may comprise at least four lenses arranged along an optical axis O-I from a user's eye-side to a display D. The at least four lenses including a first lens L1 and a second lens L2. The first lens L1 closest to the user's eye-side of the of the at least four lenses may include at least one flat surface, and a first quarter wave plate (QWP) 103 and a first refractive member 102 disposed thereon. A second lens L2 from the user's eye-side may include at least one convex surface and a second refractive member 104 formed on the at least one convex surface.

According to an embodiment, a wearable electronic device meeting formula 1 and formula 2 below may be provided.

$$M12 \geq 0.99 \quad \text{[formula 1]}$$

$$TTL/ImgH \leq 1.75 \quad \text{[formula 2]}$$

(wherein M12 formulais a combined group magnification of the first lens and second lens, TTL formulais a distance between an eye-side surface of the user's eye-side first lens and the display, and ImgH formulais a maximum image height of the display).

According to an embodiment, the first refractive member 102 may be a reflective polarizer and is laminated with the first quarter wave plate 103, thereby forming a first film portion F1.

According to an embodiment, the second refractive member 104 comprises a beam splitter.

According to an embodiment, the wearable electronic device may further comprise a second quarter wave plate 105 and a polarizer 106 disposed between the at least four lenses and the display.

According to an embodiment, the first lens L1 may have a user's eye-side surface S2, that is convex, and a display-side surface S3 that is flat.

According to an embodiment, the user's eye-side first lens L1 may have the user's eye-side surface S2, that is flat, and a display-side surface S3 that is convex.

According to an embodiment, a wearable electronic device meeting formula 3 below may be provided.

$$80° \leq Fov \leq 100° \quad \text{[formula 3]}$$

(wherein Fov in conditional equation 3 is a field of view of an overall optical system).

According to an embodiment, lenses L1, L2, L3, and L4 comprises plastic lenses.

According to an embodiment, at least one lens among lenses of lenses L1, L2, L3, and L4 has an aspheric surface.

According to an embodiment, the first lens may have a positive refractive power, the second lens has a positive refractive power, the third lens has a negative refractive power, and the fourth lens has a positive refractive power.

According to an embodiment, there may be provided a wearable electronic device in which a difference in Abbe's number between a third lens L3 and a fourth lens L4 satisfies formula 4 below.

$$25 \leq |V_4 - V_3| \leq 40 \quad \text{[formula 4]}$$

(wherein $V_3$ formulais an Abbe's number of the third lens, and $V_4$ is an Abbe's number of the fourth lens).

According to an embodiment, there may be provided a wearable electronic device in which an angle of a chief ray incident from the display D to a lens satisfies formula 5 below.

$$D_{CRA} \leq 35° \quad \text{[formula 5]}$$

(wherein $D_{CRA}$ in conditional equation 5 is the angle of the chief ray incident from the display to the lens).

According to an embodiment, the first lens L1 and the second lens L2 are configured to move along an optical axis direction.

According to an embodiment, augmented reality (AR), virtual reality (VR), mixed reality (MR), or extended reality (XR) may be applied to the wearable electronic device.

According to an embodiment, the wearable electronic device may be of a visual see-through (VST) type.

According to an embodiment of the disclosure, a wearable electronic device 100 may comprise a first lens L1, a second lens L2, a third lens L3, and a fourth lens L4 sequentially arranged along an optical axis direction from a user's eye-side to a display. The first lens L1 may include a user's eye-side surface S2 having a substantially flat surface laminated with a first quarter wave plate 103 and a reflective polarizer 102 on the flat surface. The second lens L2 may include at least one convex surface on which a beam splitter 104 is formed. A second quarter wave plate 105 and a polarizer 106 may be formed on a display-side surface S9 of the fourth lens L4. The user's eye-side first lens L1 and the user's eye-side second lens L2 are configured to move on an optical axis. In this case, the user's eye-side third lens L3 and the user's eye-side fourth lens L4 may be fixed in position.

According to an embodiment, a wearable electronic device meeting formula 1 and formula 2 below may be provided.

$$M12 \geq 0.99 \quad \text{[formula 1]}$$

$$TTL/ImgH \leq 1.75 \quad \text{[formula 2]}$$

(wherein M12 formulais a combined group magnification of the first lens and the second lens, TTL formulais a distance between an eye-side surface of the first lens and the display, and ImgH formulais a maximum image height of the display).

According to an embodiment, a wearable electronic device meeting formula 3 below may be provided.

$$80 \leq Fov \leq 100° \quad \text{[formula 3]}$$

(wherein Fov in conditional equation 3 is a field of view of an overall optical system).

According to an embodiment, lenses included in the lens assembly may have a positive refractive power, a positive refractive power, a negative refractive power, and a positive refractive power in order from the user's eye-side.

According to an embodiment, there may be provided a wearable electronic device in which a difference in Abbe's number between the third lens L3 and the fourth lens L4 satisfies formula 4 below.

$$25 \leq |V_4 - V_3| \leq 40 \quad \text{[formula 4]}$$

(wherein $V_3$ formulais an Abbe's number of the third lens, and $V_4$ is an Abbe's number of the fourth lens).

According to an embodiment, there may be provided a wearable electronic device in which an angle of a chief ray incident from the display D to a lens satisfies formula 5 below.

$$D_{CRA} \leq 35° \quad \text{[formula 5]}$$

(wherein $D_{CRA}$ in conditional equation 5 is the angle of the chief ray incident from the display to the lens).

While the present invention has been shown and described with reference to exemplary embodiments thereof, it will be apparent to those of ordinary skill in the art that various changes in form and detail may be made thereto without departing from the spirit and scope of the disclosure as defined by the following claims. For example, in specific embodiments of the disclosure, the measurements of the plurality of lenses may be properly set depending on the structure, specifications, or actual use environment of the camera module and electronic device to be actually manufactured.

The invention claimed is:

1. A wearable electronic device comprising:

a display comprising at least one display member;

at least four lenses arranged along an optical axis from a user's eye-side to the display, the at least four lenses including a first lens and a second lens disposed in the order farthest from the display;

wherein the first lens includes at least one flat surface, and a first quarter wave plate and a first refractive member disposed on the at least one flat surface, wherein the second lens includes at least one convex surface and a second refractive member disposed on the at least one convex surface, wherein the first lens and the second lens are configured to move in an optical axis direction to enable diopter adjustment, and a third lens and a fourth lens are fixed during diopter adjustment, and wherein the wearable electronic device satisfies formula 1 and formula 2 as set forth below, $$M12 > 0.99 \quad \text{[formula 1]}$$

$$TTL/ImgH < 1.75 \quad \text{[formula 2]}$$

(wherein M12 in formula 1 is a combined group magnification of the first lens and second lens, TTL in formula 2 is a "total top length", indicating a distance between an eye-side surface of the first lens and the display, and ImgH in formula 2 is a maximum image height of the display).

2. The wearable electronic device of claim 1, wherein the first refractive member is a reflective polarizer and is laminated with the first quarter wave plate, thereby forming a first film portion.

3. The wearable electronic device of claim 1, wherein the second refractive member comprises a beam splitter.

4. The wearable electronic device of claim 1, further comprising a second quarter wave plate and a polarizer disposed between the at least four lenses and the display.

5. The wearable electronic device of claim 1, wherein the first lens includes a user's eye-side surface that is convex, and a display-side surface that is flat.

6. The wearable electronic device of claim 1, wherein the first lens includes a user's eye-side surface that is flat, and a display-side surface that is convex.

7. The wearable electronic device of claim 1, wherein the wearable electronic device satisfies formula 3 as set forth below, $$80° \leq Fov \leq 100° \quad \text{[formula 3]}$$

(wherein Fov in formula 3 is a field of view of an overall optical system).

8. The wearable electronic device of claim 1, wherein each one of the at least four lenses are plastic lenses.

9. The wearable electronic device of claim 1, wherein at least one lens of the at least four lenses has an aspheric surface.

10. The wearable electronic device of claim 1, wherein the first lens has a positive refractive power, the second lens has a positive refractive power, and wherein the at least four lenses includes a third lens, and a fourth lens, the third lens being disposed second from the display and having a negative refractive power, and the fourth lens being disposed first from the display and having a positive refractive power.

11. The wearable electronic device of claim 10, wherein a difference in Abbe's number between the third lens and the fourth lens satisfies formula 4 as set forth below, $$25 \leq |V_4 - V_3| \leq 40 \quad \text{[formula 4]}$$

(wherein $V_3$ in formula 4 is an Abbe's number of the third lens, and $V_4$ is an Abbe's number of the fourth lens).

12. The wearable electronic device of claim 1, wherein an angle of a chief ray incident from the display) to a lens satisfies formula 5 as set forth below, $$D_{CRA} \leq 35° \quad \text{[formula 5]}$$

(wherein $D_{CRA}$ in formula 5 is the angle of the chief ray incident from the display to the lens).

13. The wearable electronic device of claim 1, wherein augmented reality (AR), virtual reality (VR), mixed reality (MR), or extended reality (XR) is applied to the wearable electronic device.

14. The wearable electronic device of claim 1, wherein the wearable electronic device is of a visual see-through (VST) type.

15. A wearable electronic device comprising:

a display comprising at least one display member:

a first lens, a second lens, a third lens, and a fourth lens sequentially arranged along an optical axis direction from a user's eye-side to the display;

wherein the first lens includes a substantially flat surface laminated with a first quarter wave plate and a reflective polarizer on the substantially flat surface, wherein the second lens includes at least one convex surface having a beam splitter formed thereon, wherein a second quarter wave plate and a polarizer are formed on a display-side surface of the fourth lens, wherein the first lens and the second lens are configured to move on an optical axis direction to enable diopter adjustment, wherein the third lens and the fourth lens are fixed during diopter adjustment, and wherein the wearable electronic device satisfies formula 1 and formula 2 as set forth below, $$M12 \geq 0.99 \quad \text{[formula 1]}$$

$$TTL/ImgH < 1.75 \quad \text{[formula 2]}$$

(wherein M12 in formula 1 is a combined group magnification of the first lens and the second lens, TTL in formula 2 is a "total top length" indicating a distance between an eye-side surface of the first lens and the display, and ImgH in formula 2 is a maximum image height of the display).

16. The wearable electronic device of claim 15, wherein formula 3 below is met, $$80 \leq Fov \leq 100° \quad \text{[formula 3]}$$

(wherein Fov in formula 3 is a field of view of an overall optical system).

17. The wearable electronic device of claim 15, wherein the first lens has a positive refractive power, the second lens has a positive refractive power, the third lens has a negative refractive power, and the fourth lens has a positive refractive power.

18. The wearable electronic device of claim 15, wherein a difference in Abbe's number between the third lens and the fourth lens satisfies formula 4 below, $$25 \leq |V_4 - V_3| \leq 40 \quad \text{[formula 4]}$$

(wherein $V_3$ in formula 4 is an Abbe's number of the third lens, and $V_4$ is an Abbe's number of the fourth lens).

19. The wearable electronic device of claim 15, wherein an angle of a chief ray incident from the display (D) to a lens satisfies formula 5 below, $$D_{CRA} \leq 35° \quad \text{[formula 5]}$$

(wherein $D_{CRA}$ in formula 5 is the angle of the chief ray incident from the display to the lens).

* * * * *